(12) United States Patent
Miller et al.

(10) Patent No.: US 8,760,416 B2
(45) Date of Patent: Jun. 24, 2014

(54) UNIVERSAL TOUCH INPUT DRIVER

(75) Inventors: Mark Frederick Miller, Wylie, TX (US); Xiangying Meng, Frisco, TX (US); Matthew Ryan Bugbee, Plano, TX (US)

(73) Assignee: Dedo Interactive, Inc., Plano, TX (US)

( * ) Notice: Subject to any disclaimer, the term of this patent is extended or adjusted under 35 U.S.C. 154(b) by 584 days.

(21) Appl. No.: 12/893,375

(22) Filed: Sep. 29, 2010

(65) Prior Publication Data

US 2011/0080360 A1  Apr. 7, 2011

Related U.S. Application Data

(60) Provisional application No. 61/247,964, filed on Oct. 2, 2009.

(51) Int. Cl.
*G06F 3/041* (2006.01)

(52) U.S. Cl.
USPC .................................................. 345/173

(58) Field of Classification Search
CPC . G06F 3/08; G06F 13/102; G06F 2003/0697; G06F 2009/45579
USPC ........ 345/156–184; 463/36–38; 715/700–866
See application file for complete search history.

(56) References Cited

U.S. PATENT DOCUMENTS

| | | | | |
|---|---|---|---|---|
| 5,731,530 A * | 3/1998 | Fujiwara et al. | .................. | 84/21 |
| 5,732,283 A * | 3/1998 | Rose et al. | ...................... | 710/16 |
| 5,807,175 A * | 9/1998 | Davis et al. | ..................... | 463/36 |
| 5,929,844 A * | 7/1999 | Barnes | ......................... | 345/156 |
| 6,008,777 A * | 12/1999 | Yiu | ................................ | 345/2.1 |
| 6,198,485 B1 * | 3/2001 | Mack et al. | .................... | 345/419 |
| 6,282,586 B1 * | 8/2001 | Bullough | ........................ | 710/18 |
| 7,007,070 B1 * | 2/2006 | Hickman | ....................... | 709/208 |
| 7,736,231 B2 * | 6/2010 | Evans et al. | ..................... | 463/36 |
| 7,870,496 B1 * | 1/2011 | Sherwani | ...................... | 715/761 |
| 7,895,342 B2 * | 2/2011 | Sodergren | ..................... | 709/230 |
| 7,928,964 B2 * | 4/2011 | Kolmykov-Zotov et al. | . . | 345/173 |
| 2001/0037254 A1 * | 11/2001 | Glikman | ......................... | 705/26 |
| 2004/0019895 A1 * | 1/2004 | Dubal | ........................... | 719/321 |
| 2004/0075820 A1 * | 4/2004 | Chu et al. | ...................... | 353/122 |
| 2005/0130738 A1 * | 6/2005 | Miyamoto et al. | ............. | 463/30 |
| 2006/0004680 A1 * | 1/2006 | Robarts et al. | .................. | 706/12 |
| 2006/0005127 A1 * | 1/2006 | Ferguson et al. | ............. | 715/522 |
| 2006/0022956 A1 * | 2/2006 | Lengeling et al. | ............ | 345/173 |
| 2006/0026317 A1 * | 2/2006 | Niikura | .......................... | 710/62 |
| 2007/0209052 A1 * | 9/2007 | Taylor et al. | .................... | 725/86 |
| 2007/0226129 A1 * | 9/2007 | Liao et al. | ....................... | 705/38 |
| 2008/0029691 A1 | 2/2008 | Han | | |
| 2008/0304408 A1 * | 12/2008 | Kraemer et al. | ............. | 370/230 |
| 2009/0002217 A1 * | 1/2009 | Kryze et al. | .................... | 341/176 |
| 2010/0020025 A1 * | 1/2010 | Lemort et al. | ................. | 345/173 |
| 2010/0046088 A1 * | 2/2010 | Kubota | ......................... | 359/697 |
| 2010/0060607 A1 * | 3/2010 | Ludwig | ......................... | 345/173 |
| 2010/0095773 A1 * | 4/2010 | Shaw et al. | ................. | 73/514.31 |
| 2010/0097316 A1 * | 4/2010 | Shaw et al. | .................... | 345/158 |
| 2010/0174506 A1 * | 7/2010 | Joseph et al. | .................. | 702/141 |
| 2010/0259493 A1 * | 10/2010 | Chang et al. | ................... | 345/173 |
| 2011/0080344 A1 * | 4/2011 | Dura et al. | ..................... | 345/163 |

* cited by examiner

*Primary Examiner* — Gene W Lee

(74) *Attorney, Agent, or Firm* — Westman, Champlin & Koehler, P.A.; Theodore M. Magee

(57) ABSTRACT

A universal touch input driver includes a device driver interface through which touch data is obtained from a device driver. Also included is a computation module that processes the touch data and converts it into a standardized format. Also included is an application interface through which the standardized touch data is transferred to a touch input application.

13 Claims, 35 Drawing Sheets

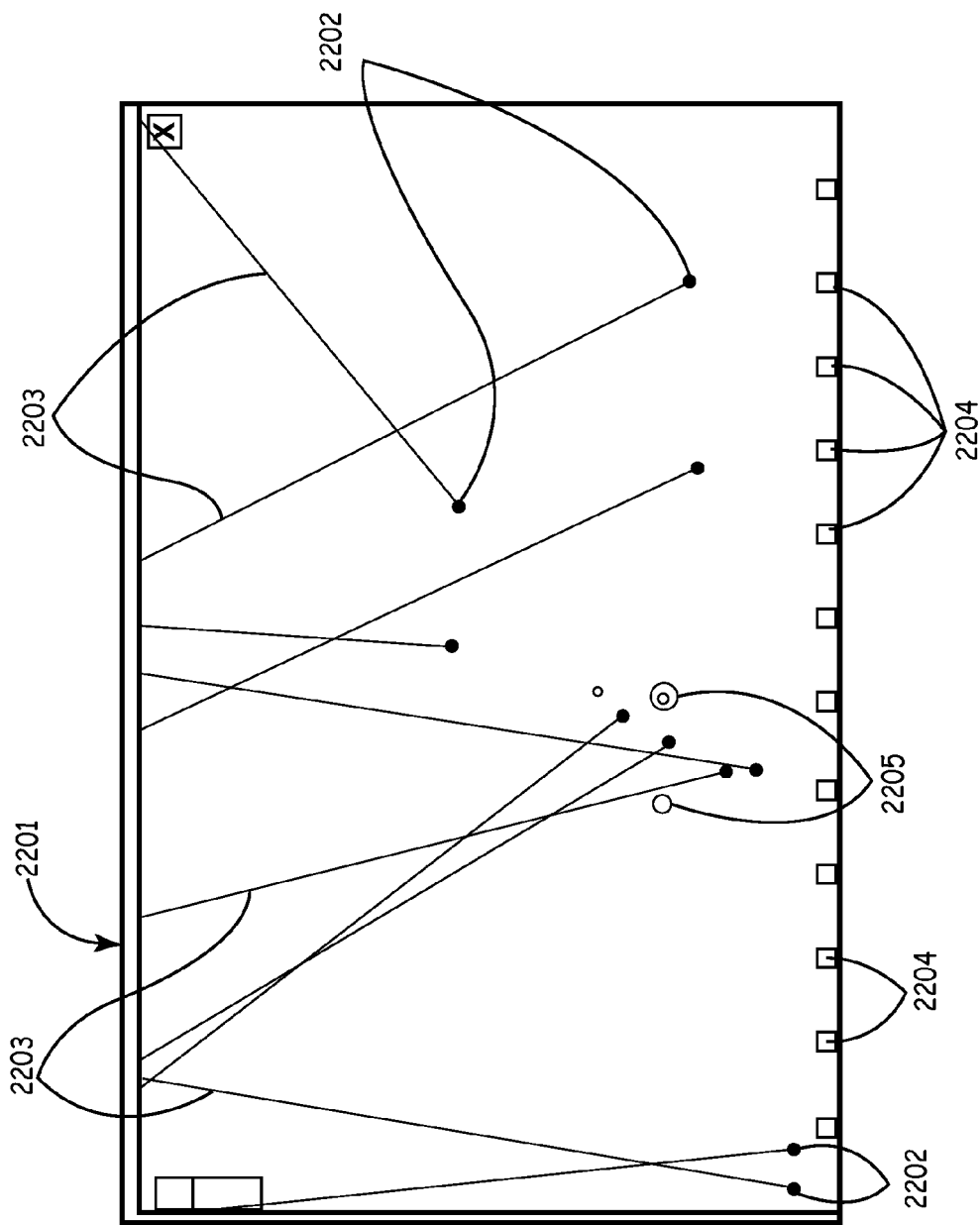

UNIVERSAL TOUCH INPUT DRIVER

CROSS-REFERENCE TO RELATED APPLICATION

The present application is based on and claims the benefit of U.S. provisional patent application Ser. No. 61/247,964, filed Oct. 2, 2009, the content of which is hereby incorporated by reference in its entirety.

BACKGROUND

In multitouch systems, a user is able to provide input by touching or otherwise contacting multiple areas of a touch screen simultaneously. Multitouch systems provide for opportunities for new types of user interactions and experiences that have not been possible in single touch or non-touch systems. Some multitouch systems have included frustrated total internal reflectance systems and capacitive systems.

SUMMARY

Embodiments described herein pertain to a universal touch input driver that includes a device driver interface through which touch data is obtained from a device driver. Also included is a computation module that processes the touch data and converts it into a standardized format. Also included is an application interface through which the standardized touch data is transferred to a touch input application.

These and various other features and advantages that characterize the claimed embodiments will become apparent upon reading the following detailed description and upon reviewing the associated drawings.

BRIEF DESCRIPTION OF THE DRAWINGS

FIGS. 18-1, 18-2, and 18-3 are screenshots from an Application Launcher multitouch application.

FIGS. 19-1, 19-2, 19-3, 19-4, 19-5, and 19-6 illustrate multitouch gestures that may be utilized with the multitouch applications described in this disclosure.

FIGS. 20-1, 20-2, 20-3, 20-4, and 20-5 are screenshots of a Chat and Group Collaboration multitouch application.

FIGS. 21-1 and 21-2 are screenshots of a Finger Painting multitouch application.

FIG. 22 is a screenshot of a Falling Debris multitouch application.

FIGS. 25-1, 25-2, 25-3, 25-4, 25-5, and 25-6 are screenshots of a Flight Scheduling multitouch application.

DETAILED DESCRIPTION

Figure 1:
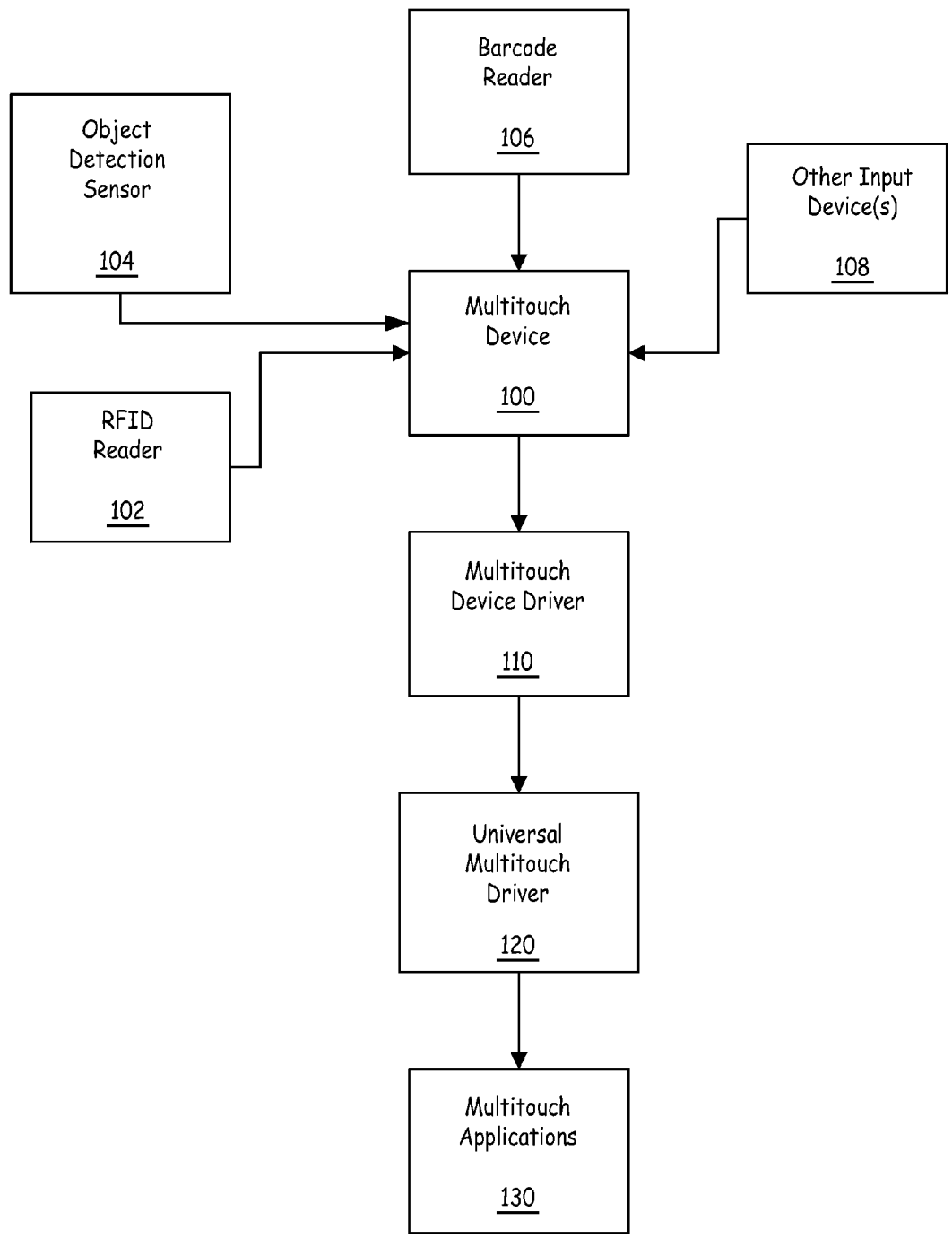
FIG. 1 is a block diagram of a multitouch environment.

Embodiments of the present disclosure include systems and methods that may be utilized in multitouch environments. FIG. 1 is a block diagram of one illustrative environment in which some embodiments may be incorporated. It should be noted however that FIG. 1 is for illustration purposes only and that embodiments are not limited to any particular environment. Embodiments are illustratively incorporated in any multitouch environment.

FIG. 1 shows a multitouch device 100 that is optionally communicatively coupled to a radio frequency identification reader 102, an object detection sensor 104, and a barcode reader 106. As will be described in greater detail later, these input devices illustratively collect information that is utilized in combination with multitouch information from the multitouch device. For instance, in one embodiment, such as in that shown in FIGS. 25-1 to 25-6, a multitouch device 100 is running a flight scheduling application. In that embodiment, users are illustratively able to use barcode reader 106 to scan their boarding pass and are then able to make changes to their flight plans by making selections on the screen of multitouch device 100. FIG. 1 also shows that device 100 is optionally coupled to other input devices 108. This is to illustrate that embodiments are not limited to having any particular other type of input devices connected to a multitouch device and optionally include any other type of input device.

A multitouch device driver 110 communicates with multitouch device 100 to obtain multitouch input information collected from a user. For instance, multitouch device 100 may collect input information that includes x-axis coordinates and y-axis coordinates for touch gestures. Device driver 110 obtains that information from device 100. The input information is then passed along to a universal multitouch device driver 120. As those skilled in the art will recognize, multitouch device drivers 110 commonly have different types of outputs. For example, the format or syntax of outputs may vary (e.g. TUIO and HID). Also for example, the outputs may have different types or amounts of information. For instance, some multitouch devices 100 only output x and y coordinates while other devices 100 output x and y coordinates along with a change in x, a change in y, a width, a height, and an acceleration. Universal multitouch device driver 120 is illustratively able to collect the outputs of many different types of device drivers 110 and convert the outputs into a standardized or universal format. The output of universal driver 120 is then transmitted or collected by one or more applications 130. Applications 130 are illustratively multitouch applications. Several examples of multitouch applications 130 are discussed later in this description. Embodiments are not however limited to only multitouch applications and also illustratively include single touch or no touch applications.

I. MULTITOUCH DEVICES

Embodiments of the present disclosure are illustratively practiced with any type of multitouch device. Several different types of systems and methods are able to collect multitouch information. Some common types of multitouch devices include those that detect touches utilizing capacitive screens and those that detect touches utilizing a vision based system. Some illustrative embodiments of multitouch devices are described below.

FIGS. 2, 4, 6 and 8 show a wall type multitouch device 200. Device 200 is referred to as a wall system because its screen 202 has a relatively large form factor. For example, in one embodiment, the height 204 of screen 202 is forty-six inches, and the width 206 of screen 202 is eighty inches. Embodiments are not however limited to any particular dimensions, and embodiments illustratively include screens 202 that have any shape or size. Additionally, multiple devices 200 may be connected together and function as an even bigger wall.

Device 200 also includes a depth 208. Depth 208 may be any value. In one embodiment, for illustrative purposes only and not by limitation, depth 208 is twenty-six inches. In at least certain embodiments of the present disclosure, depths 208 are able to be kept relatively short by utilizing multiple projectors and/or low throw projectors to display graphics on screen 202. Embodiments may however have other configurations such as, but not limited to, systems that utilize only one projector and/or those having longer depths 208.

Figure 2:
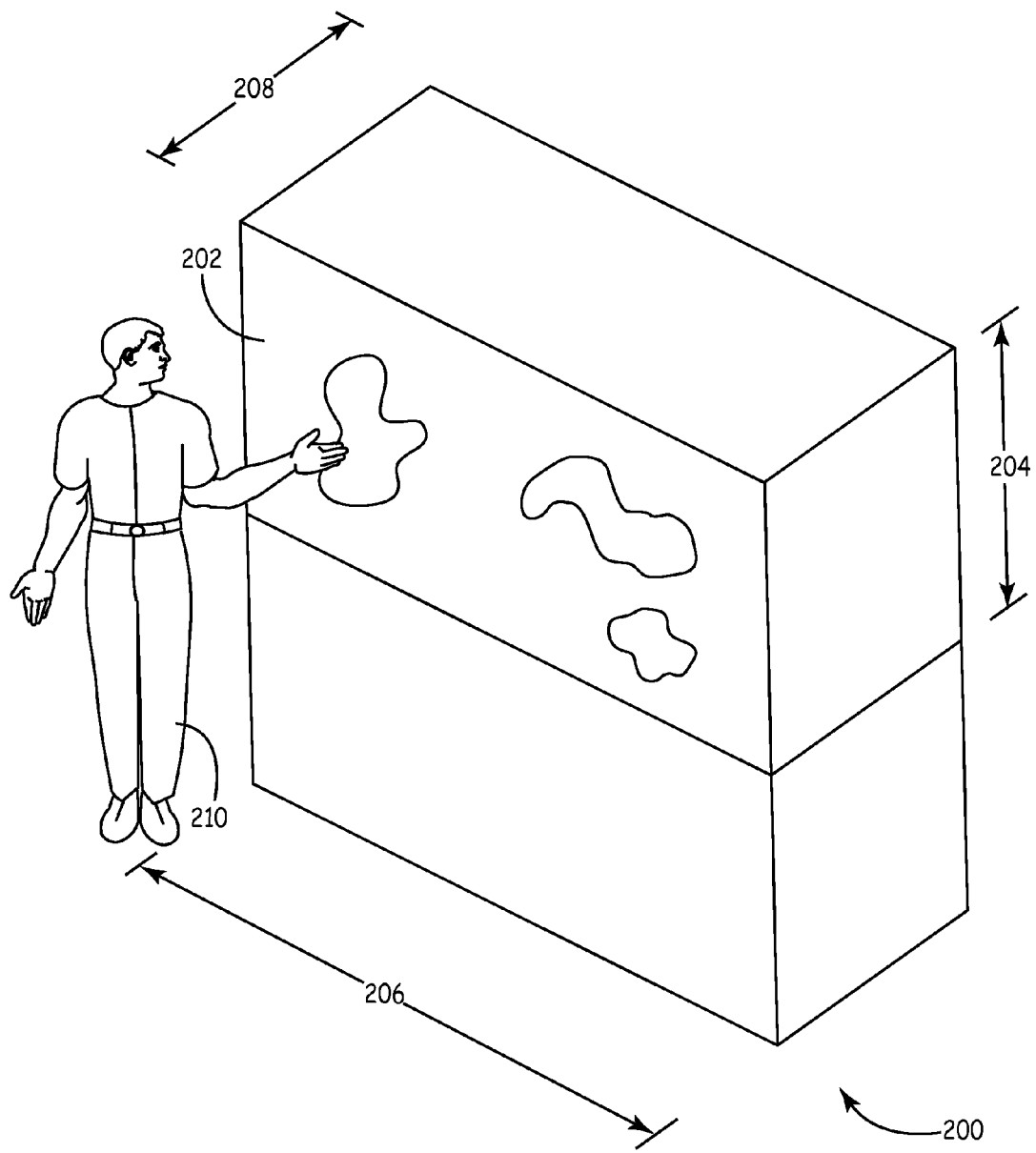
FIG. 2 is a perspective view of a wall type multitouch device.
Figure 3:
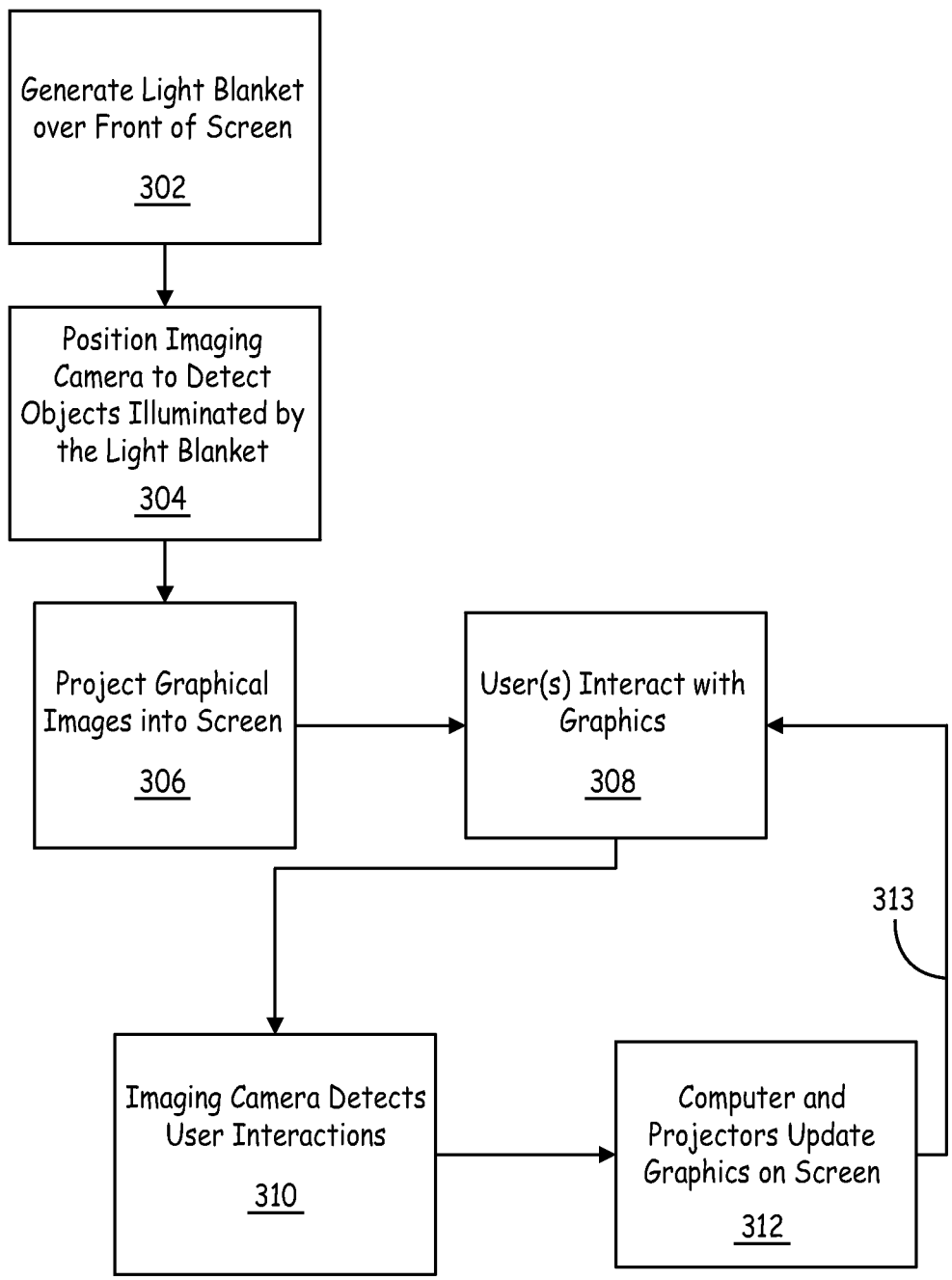
FIG. 3 is a process flow diagram illustrating the operation of a multitouch device.

FIG. 3 is a flow diagram showing one method of operating multitouch devices such as, but not limited to, device 200 in FIG. 2. At block 302, a blanket of light is generated over the front of screen 202. For instance, in FIG. 2, a blanket of light is generated between screen 202 and user 210. At block 304, an imaging camera is positioned such that it is able to detect objects illuminated by light blanket. At block 306, graphical images are projected onto screen 202. At block 308, one or more users interact with the graphical images on the screen. For instance, in a flight scheduling application, a map may be displayed on the screen, and a user selects his destination by touching the corresponding portion of the screen. At block 310, the imaging camera detects the user's interactions. This information is then used at block 312 to update the graphics on the screen. For instance, continuing with the flight scheduling application example, once a user touches his destination, the multitouch device may show available flights going to that destination. As is indicated by arrow 313, the process then returns to block 308, and blocks 308, 310, and 312 are repeated as needed.

Figure 4:
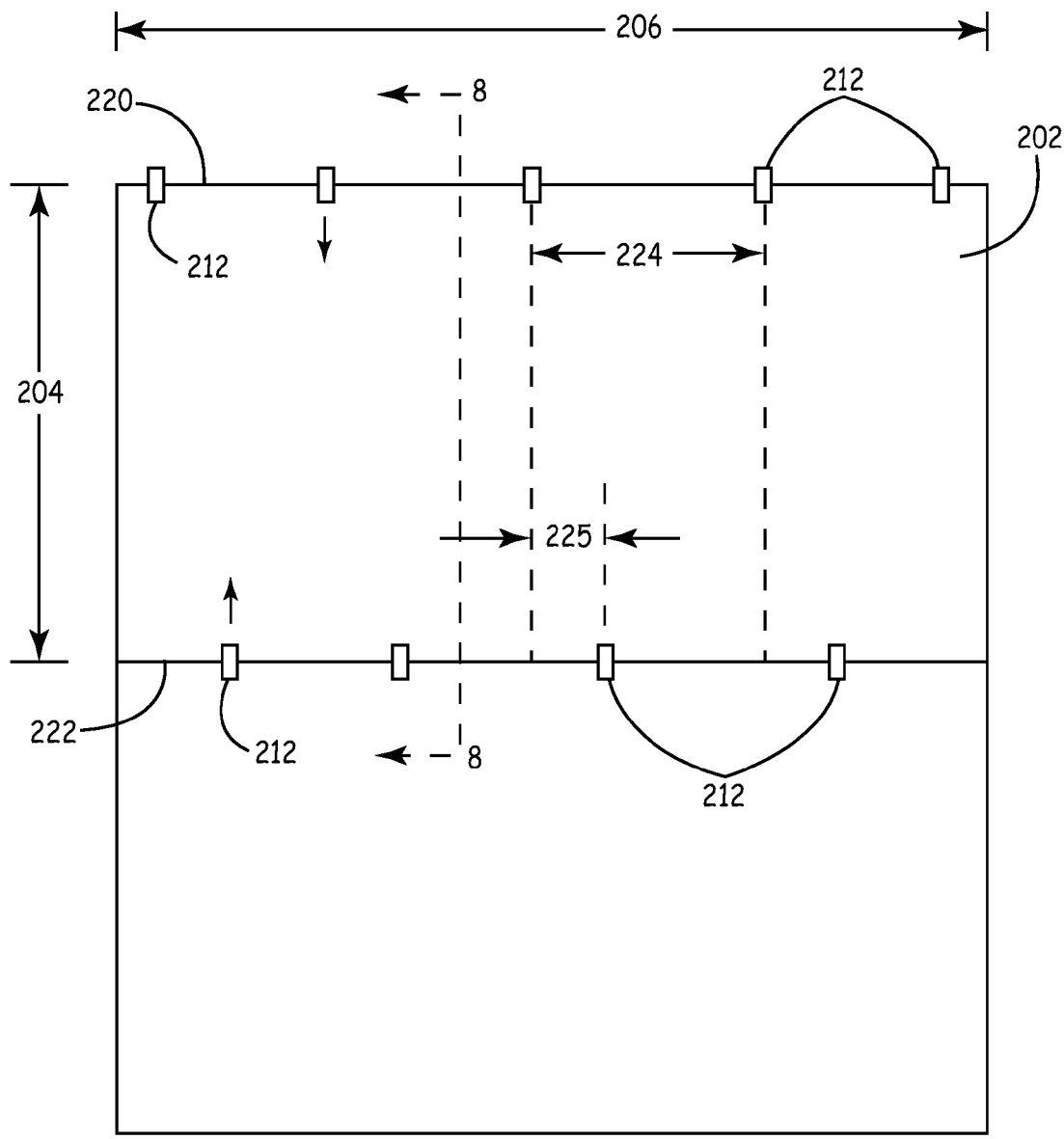
FIG. 4 is a front view of the wall type multitouch device of FIG. 2.

FIG. 4 is a schematic diagram of the front of device 200. Device 200 includes multiple light sources 212 that generate a light blanket over the front of screen 202. In one embodiment, light sources 212 are infrared laser diodes. Infrared light is useful in that it is not visually perceivable by human eyes so it does not interfere with graphics displayed on the screen. Embodiments are not however limited to any particular type of light sources and optionally include any type of light source.

Figure 5:
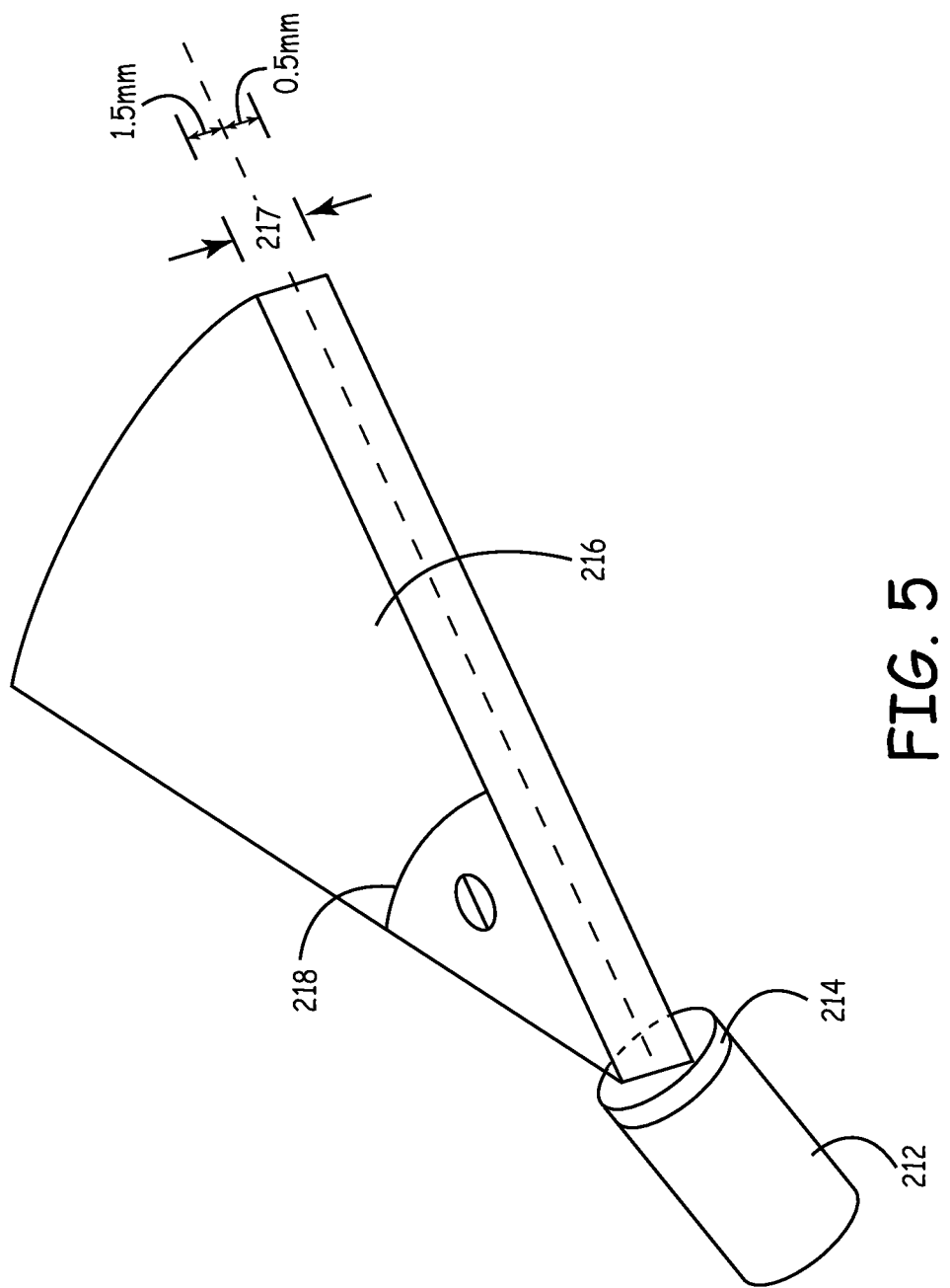
FIG. 5 is a schematic diagram of a multitouch device light source.

FIG. 5 shows one example of an infrared laser diode light source 212. In FIG. 5, the output of light source 212 is passed through a line filter 214. Filter 214 illustratively changes the light source output such that a beam of light 216 is formed that has an angle 218 and a height 217. Different filters 214 may be used to generate any desired angle 218 and height 217. For instance, in one embodiment, screen 202 is curved. In such a case, filters that are used in curved portions provide smaller angles 218 than filters used for flat portions. This enables the light blanket to be kept just in front of the screen instead of diverging away from the screen. In one embodiment, flat screens or flat portions of screens use filters that have an angle 218 that is approximately one hundred and twenty degrees and a height 217 that is approximately two millimeters. Embodiments may however utilize filters providing different angles 218 and heights 217.

Returning to FIG. 4, FIG. 4 shows that the light sources 212 at the top 220 of the screen and at the bottom 222 of the screen are each spaced apart from each other by a distance 224, and that the light sources at the top 220 are offset from the light sources at the bottom 222 by a distance 225. Distance 225 is optionally one half of distance 224. This configuration, along with the "V" shaped light beam 216 shown in FIG. 5, illustratively provides a uniform blanket of light in front of screen 202. In one particular embodiment, for illustration purposes only and not by limitation, distance 224 is twelve and a half inches and distance 225 is six and one quarter inches.

Figure 6:
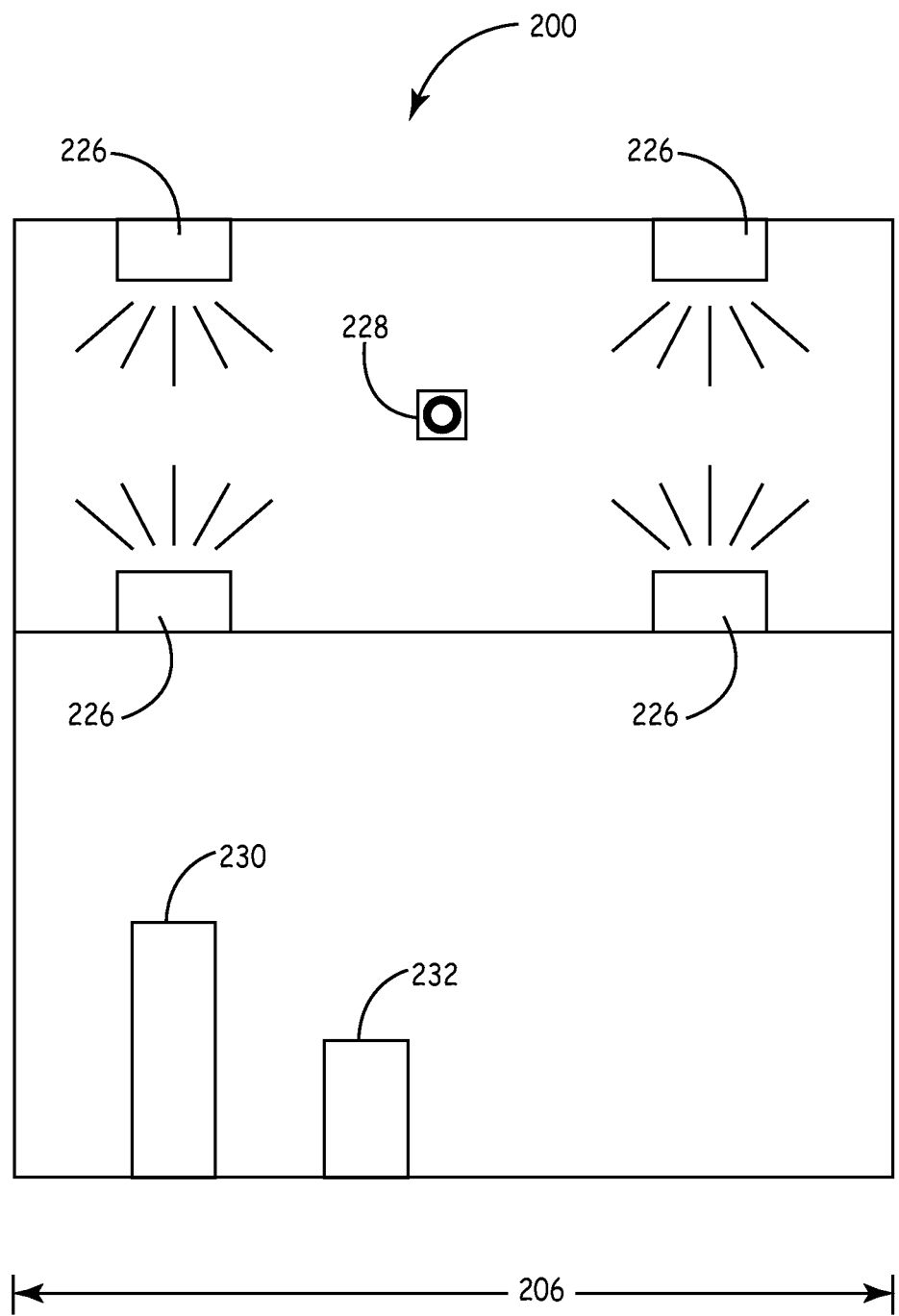
FIG. 6 is a back view of the wall type multitouch device of FIG. 2.

FIG. 6 is a schematic diagram of the back of device 200. Device 200 illustratively includes multiple projectors 226. Projectors 226 are illustratively low throw projectors. The use of multiple low throw projectors helps to reduce the depth 208 (shown in FIG. 2) of device 200 such that it has a relatively slim form factor. For instance, if only one projector was used or if non-low throw projectors were used, projectors 226 would have to be spaced further away from screen 202, and depth 208 would have to be increased. Embodiments of the present disclosure optionally include any type of projector and any number of projectors including one. For example, a system twice as long as the one shown in FIG. 6 may have eight low throw projectors.

FIG. 6 also shows that device 200 includes an imaging camera 228. Imaging camera 228 is not limited to any particular type of camera. The selection of camera 228 depends upon how the light blanket in front of the screen is formed. Camera 228 needs to be able to detect objects illuminated by the light blanket and needs to be selected accordingly. In one embodiment, in which infrared light is used to generate the light blanket, imaging camera 228 is either an infrared camera or is a camera fitted with an infrared filter such that camera 228 is able to image objects illuminated with infrared light. Camera 228 optionally includes any angle of field of view, frame rate, and resolution, and the selection of the camera is based upon the size of the screen and desired sensitivity of light detection. In one particular example, camera 228 has a field of view from 56 to 75 degrees, frames rates from 60 to 120 hertz, and resolutions from 320 by 240 to 640 by 480 pixels. In some embodiments, such as in the case of a device 200 having a longer length 206, multiple cameras 228 may be used as needed.

FIG. 6 further shows that device 200 includes a control system 230 and a power source 232 for lights 212. Control system 230 illustratively runs the operations of device 200. For instance, system 230 generates the graphics that are output to the projectors and processes any computations needed by applications running on device 200. In one embodiment, system 230 is one computer (e.g. a workstation, server, personal computer, blade, etc.). The exact implementation of system 230 is not however limited to any particular type of system or group of systems. Similarly, device 200 may or may not need a power source 232 depending upon the type of light source 212.

Figure 7:
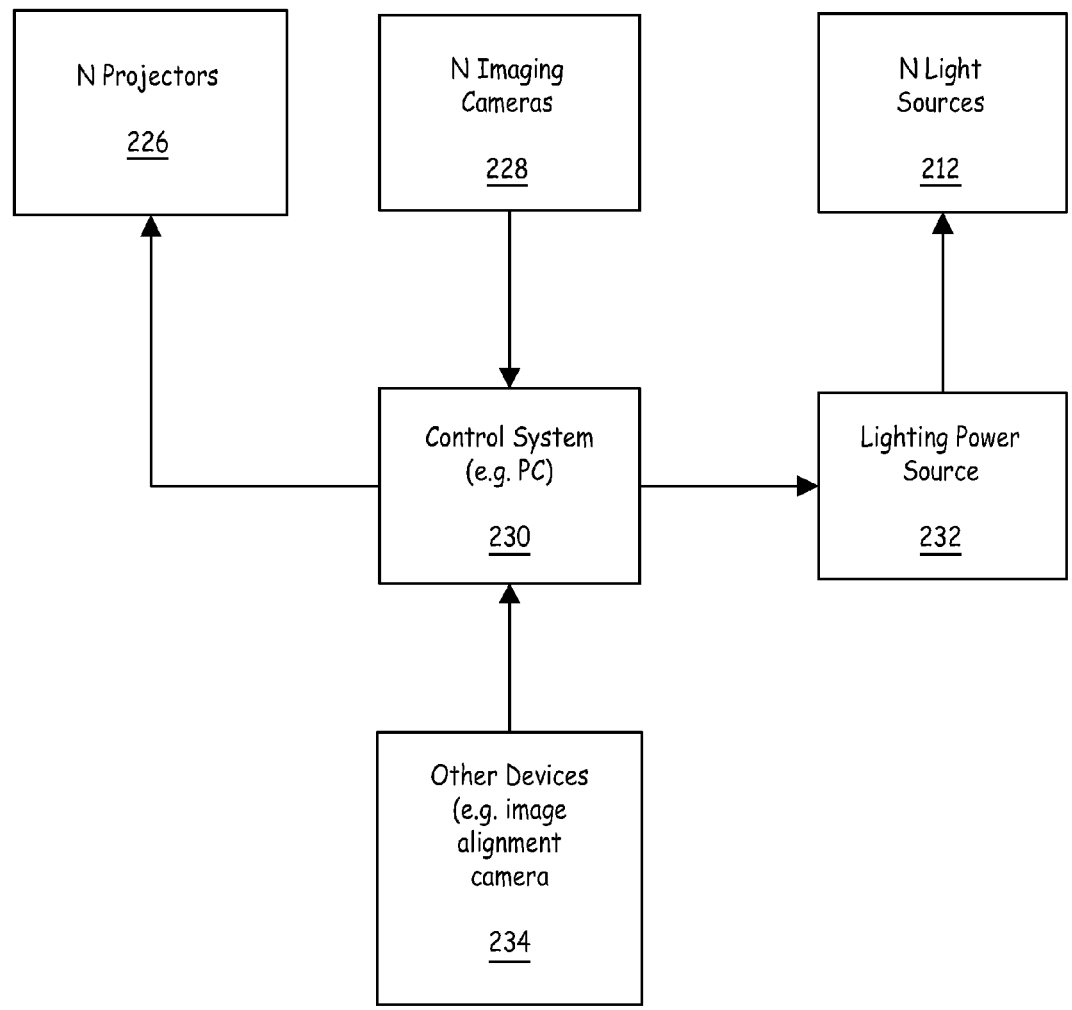
FIG. 7 is an electrical block diagram of a multitouch device.

FIG. 7 is a simplified electrical block diagram of device 200. Control system 230 operates the light power source 232 such that it controls the turning on and turning off of light sources 212. Control system receives the output of imaging cameras 228 and processes the images to determine the positions of objects illuminate by the light blanket in front of the screen. Control system 230 also generates and supplies the projectors 226 with graphics that are displayed on the device's screen.

FIG. 7 shows that device 200 is further optionally connected to other devices 234. These other devices may include an RFID reader, a barcode reader, and an object detection sensor, such as those shown in FIG. 1. Devices 234 may include any devices that are useful for applications being run on device 200. Devices 234 may also include devices that are needed for or useful for the operation of device 200. In one embodiment, devices 234 includes an additional camera that is put in front of device 200. The additional camera generates images that are used to blend the images of the multiple projectors together such that the image displayed on the screen looks as if it were generated by a single projector.

Figure 8:
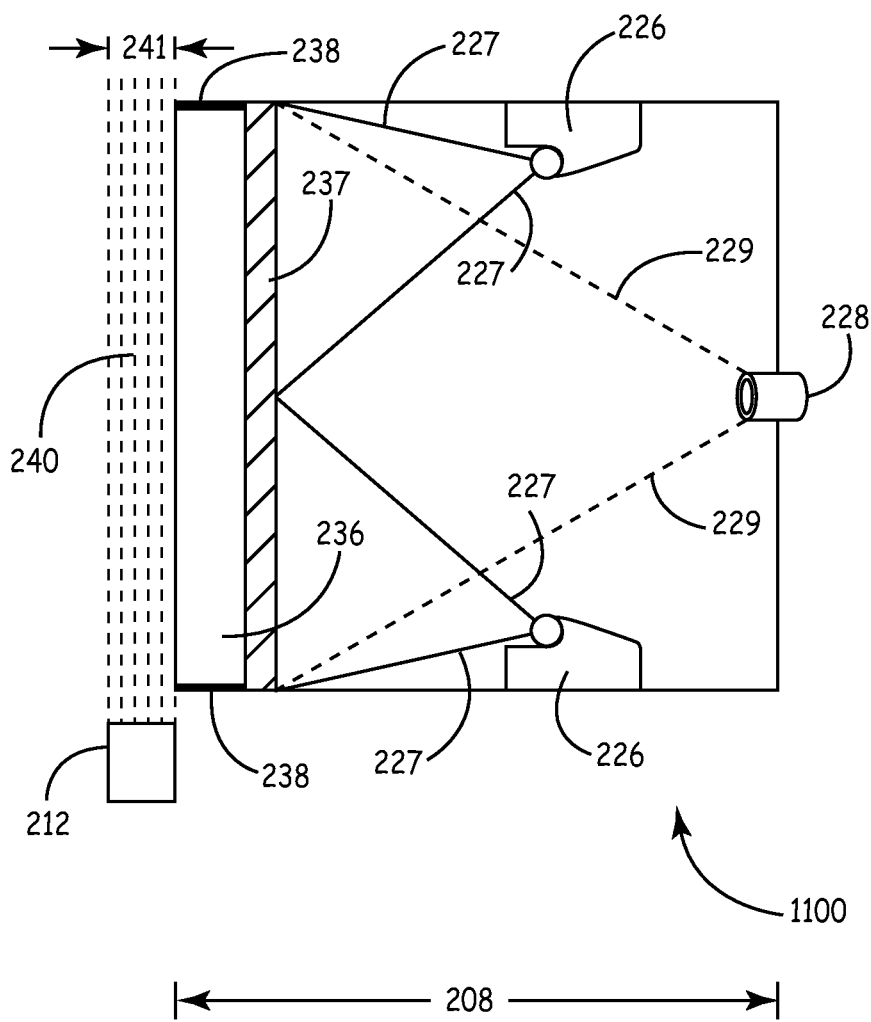
FIG. 8 is a cross-sectional view of the wall type multitouch device of FIG. 2.

FIG. 8 is a cross-section of device 200 from the perspective of line 8-8 in FIG. 4. In one embodiment, such as in the one shown in FIG. 8, the screen of device 200 includes several components. The screen illustratively includes a piece of transparent material 236 (e.g. glass or plexiglass), a backing/screen material 237, and a light absorbing edge 238 (e.g. an acid washed edge). Backing material 237 provides a surface on which the images of projectors 226 are displayed. Material 237 is chosen such that a user on the opposite side of the screen from projectors 226 can view the images. For example, material 237 is illustratively any translucent material.

FIG. 8 shows a light blanket 240 in front of the screen. Blanket 240 illustratively has a depth 241 that extends along the entire surface of the screen of device 200 (i.e. it is a three-dimensional box having the dimensions of depth 241 by height 204 (shown in FIG. 2) by width 206 (also shown in FIG. 2)). In an embodiment, light sources 212 are positioned such that their outputs overlap the screen. For example, in one embodiment, the outputs of light sources 212 have heights (e.g. height 217 in FIG. 5) that is two millimeters, and the light sources are positioned such that the one and a half millimeters of the height is in front of the glass, and the other half of a millimeter is directed to the light absorbing edge 238 that extends along the entire length 206 of the top 220 of the screen and of the bottom 222 of the screen (note: length 206, top 220, and bottom 222 are shown and labeled in FIG. 4). In another embodiment, light sources 212 may be positioned such that there is no overlap with the screen or may even be positioned such that there is a gap between the light blanket and the screen. Embodiments are not limited to any particular positioning of the light blanket relative to the screen.

FIG. 8 also shows imaginary lines 229 emanating from imaging camera 228 and quasi-imaginary lines 227 emanating from projectors 226. The imaging camera lines 229 represent the field of view of the camera and illustrate that the camera is able to detect illuminated objects over the entire surface of the screen. As was previously mentioned, in another embodiment, multiple cameras are used and the combined field of view of all the cameras covers the entire surface of the screen. The quasi-imaginary projector lines 227 represent the graphical images generated by the projectors and displayed on the screen. As is indicated in the figure, the projectors each cover only a portion of the screen. For instance, in a four projector embodiment, each projector generates an image that covers approximately one quarter of the screen.

Figure 9:
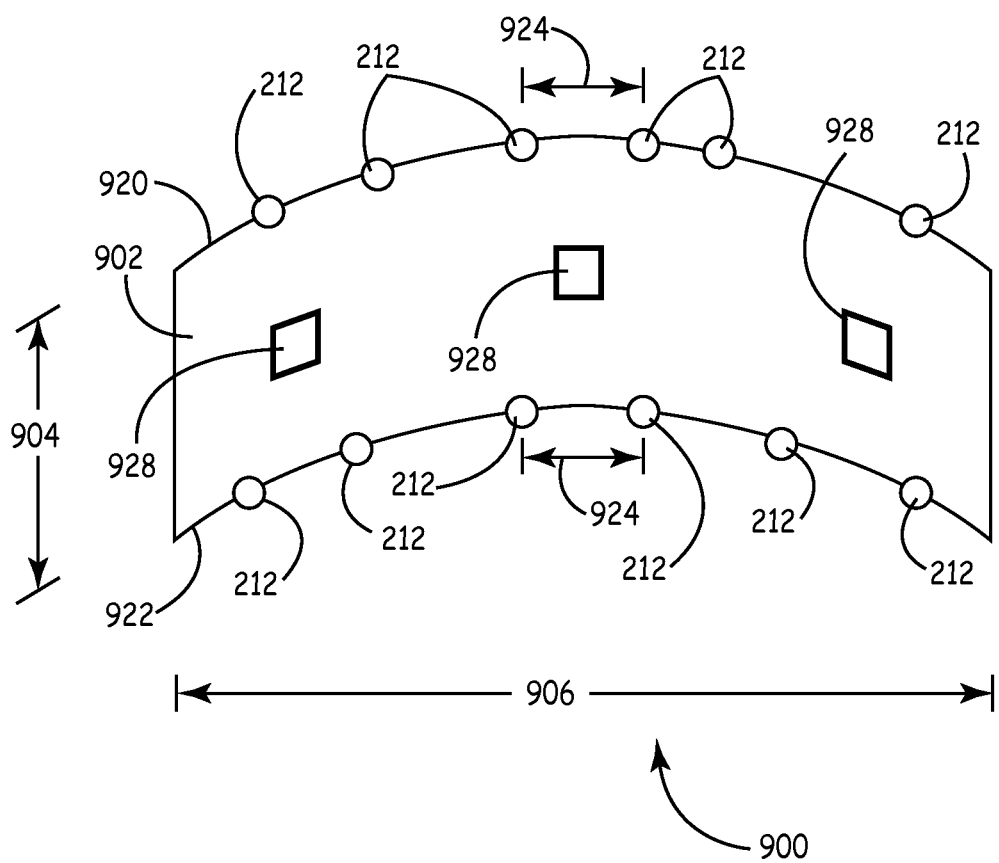
FIG. 9 is a simplified perspective view of a parabolic multitouch device.

FIG. 9 is a simplified schematic diagram of another embodiment of a multitouch device, device 900. Device 900 illustratively operates similar to device 200. One difference between device 900 and device 200 is that in device 900, the multitouch screen 902 and its corresponding light blanket are parabolic in shape as opposed to being rectangular boxes (i.e. the top 920 and bottom 922 of screen 902 are parabolic or curved). The parabolic or curved light blanket is illustratively generated by adjusting the dispersion angles (i.e. angle 218 in FIG. 5) of the light sources 212 and the spacing 924 between the light sources. For example, for straight or flat portions of a screen, light sources illustratively have an angle of one hundred and twenty degrees and light sources are spaced twelve and a half inches apart. For parabolic or curved portions of a screen, both the angles and the spacing between light sources are reduced (e.g. less than one hundred and twenty degrees and less than twelve and a half inches). The amount of the reduction depends on the rate of change of the curve. For instance, if the screen curves thirty degrees over a length of ten feet, the angles and the spacings will need to be less than if the screen only curves ten degrees over a length of ten feet. In an embodiment, the angles are reduced by connecting the light sources to line filters that provide the desired angle. These adjustments to the angles and the spacings illustratively help to ensure that the light blanket is located just above and follows the screen, as opposed to diverging away from the screen.

FIG. 9 also has three boxes 928. These boxes illustrate one potential placement of imaging cameras for device 900 (i.e. the boxes correspond to the centers of the fields of view of the cameras). As was previously mentioned, more or fewer imaging cameras may be used depending upon the size of the screen and the fields of view of the cameras. In one embodiment of device 900, its height is the same as the height of device 200 (e.g. forty-six inches tall) but its width 906 is three times as long (e.g. device 200's width is eighty inches and device 900's width is two hundred and forty inches). In such a case, device 900 illustratively uses the same type of projectors but requires twelve instead of four. Embodiments of devices 200 and 900 are not however limited to any particular dimensions, number of imaging cameras, number of projectors, or shape. As will be appreciated by those skilled in the art, the techniques that have been described allow for multitouch devices to be made that have any size or shape.

Figure 10:
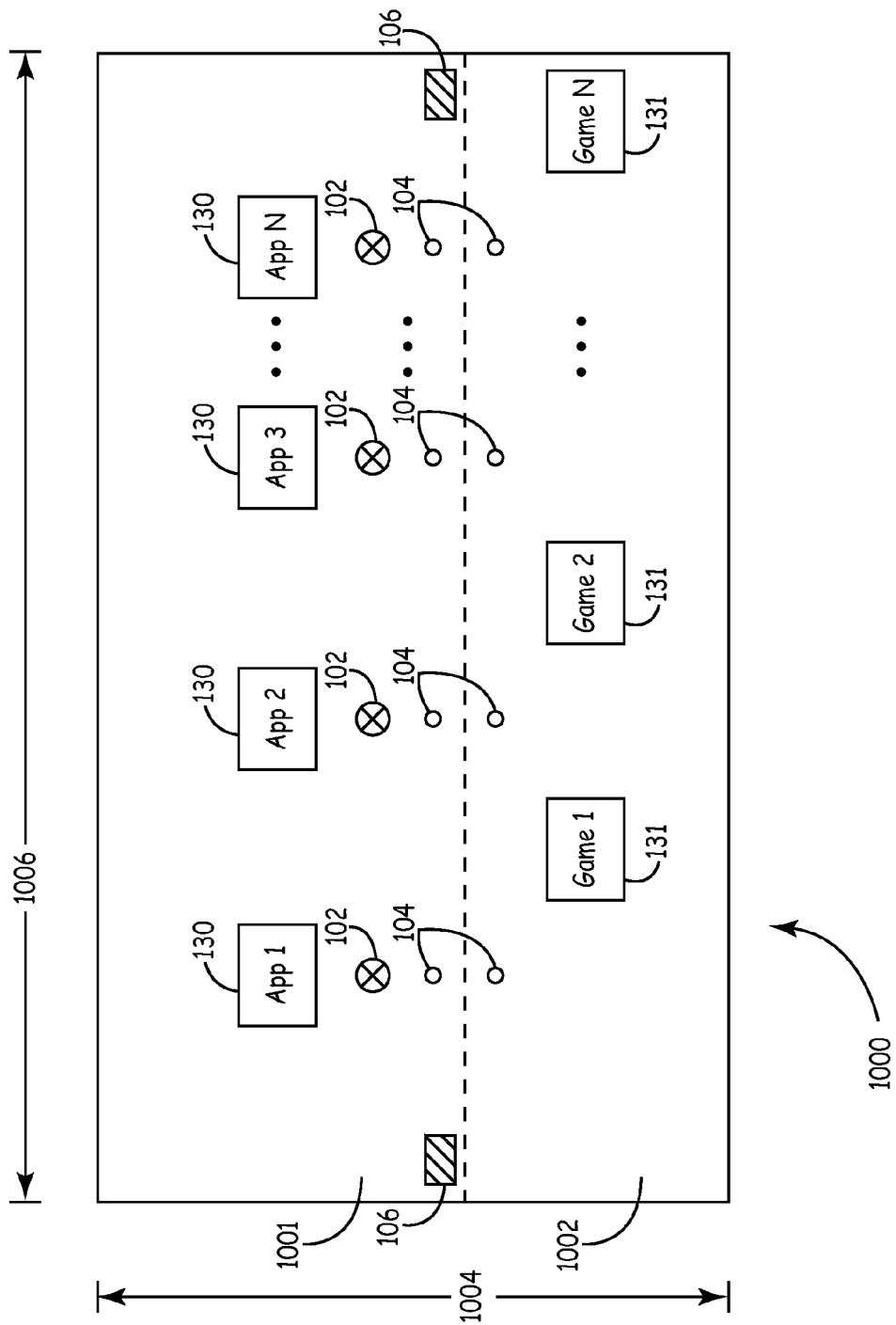
FIG. 10 is a simplified front view of an airline gate wall multitouch device.

FIG. 10 is a simplified schematic view of another embodiment of a wall type multitouch device, device 1000. In one embodiment, device 1000 is an airline gate wall and is used at an airport. The screen of device 1000 has two portions, an upper portion 1001 and a lower portion 1002. Device 1000 illustratively includes object detection sensors 104. As is shown in the figure, sensors are optionally grouped into pairs of two that are aligned in the vertical direction. Sensors 104 can be used to detect the presence of a person who may wish to interact with device 1000. In one configuration, if only the lower one of the two sensors 104 in a pair of sensors detects a person, device 1000 interprets that result as indicating that a child is present in front of its screen. Device 1000 illustratively responds by launching an application 131 on lower screen portion 1002 near where the child is detected. Application 131 can be any type of application. In one example, for illustration purposes only and not by limitation, application 131 is a game application that a child may enjoy playing with. If both of the two sensors 131 in a pair of sensors detects an object, device 1000 interprets that result as indicating that an adult is present in front of its screen. Device 1000 illustratively responds by launching an application 130 on upper screen portion 1001 near where the adult is detected. Again, application 130 can be any type of application. In one embodiment, in which device 1000 is an airline gate wall, application 130 is a flight scheduling application.

As is shown in FIG. 10, device 1000 has several pairs of sensors 104. This illustrates that device 1000 supports multiple people interacting with the device simultaneously. In the specific example shown in FIG. 10, device 1000 has four pairs of sensors 104. Embodiments may of course have more or fewer pairs of sensors including no sensors. FIG. 10 shows that device 1000 has a height 1004 and a width 1006. Height 1004 and width 1006 include any values and embodiments can be made to be any desired size to support the simultaneous use by any number of people. In one embodiment, for illustration purposes only, height 1004 is ninety inches and width 1006 is between nine and eighteen feet.

Device 1000 further optionally has multiple barcode scanners 106 and multiple RFID readers 102. Scanners 106 may be useful for certain applications 130. For instance, in the case of application 130 being a flight scheduling application, barcode scanner 106 can be used to scan a boarding pass, a confirmation e-mail, etc. RFID readers 102 can similarly be used along with applications 130. Readers 102 could for example be used to read credit card information or to read user identification information. The user identification information could be used to log into an application 130.

Figure 11:
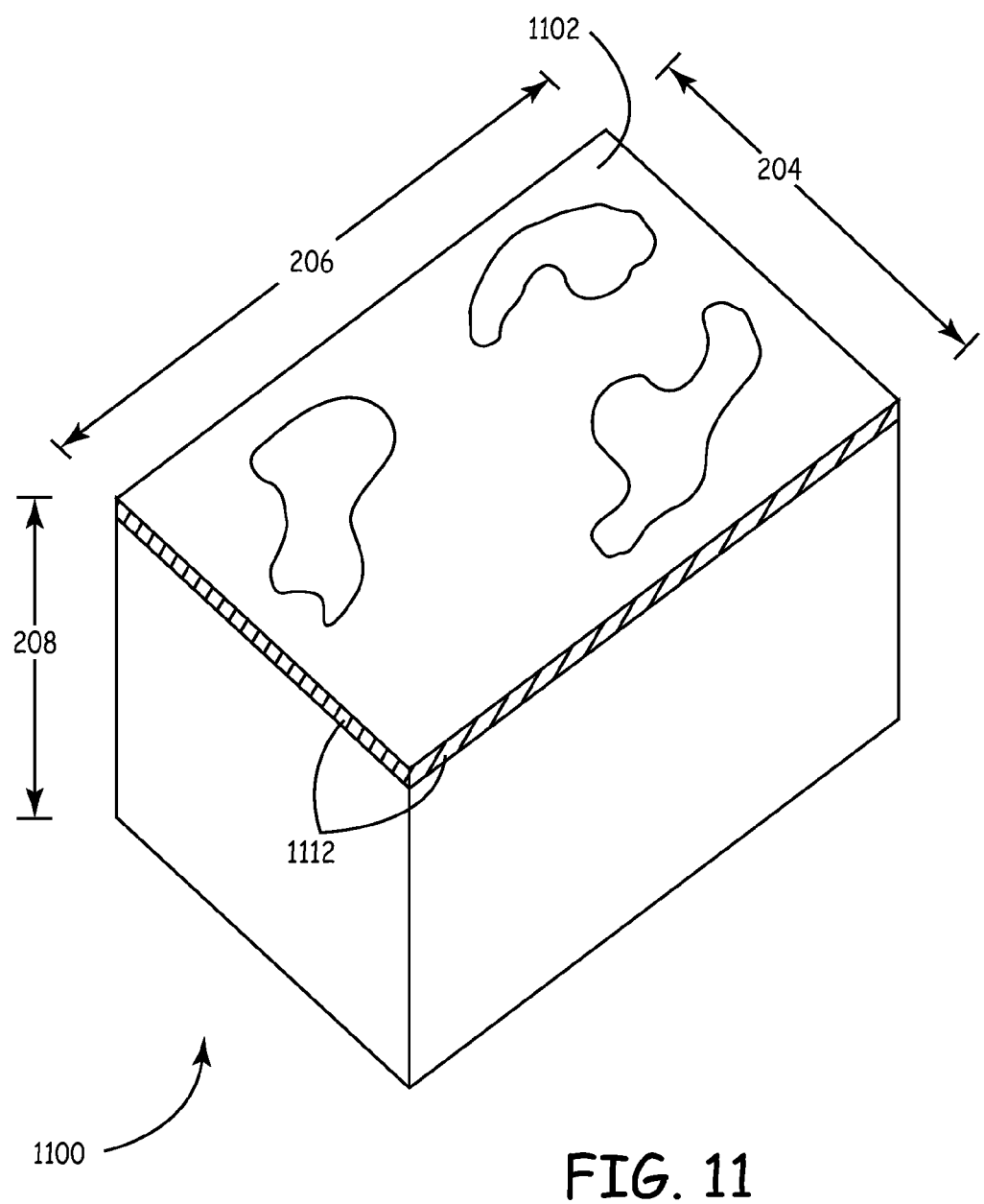
FIG. 11 is a perspective view of a table type multitouch device.
Figure 12:
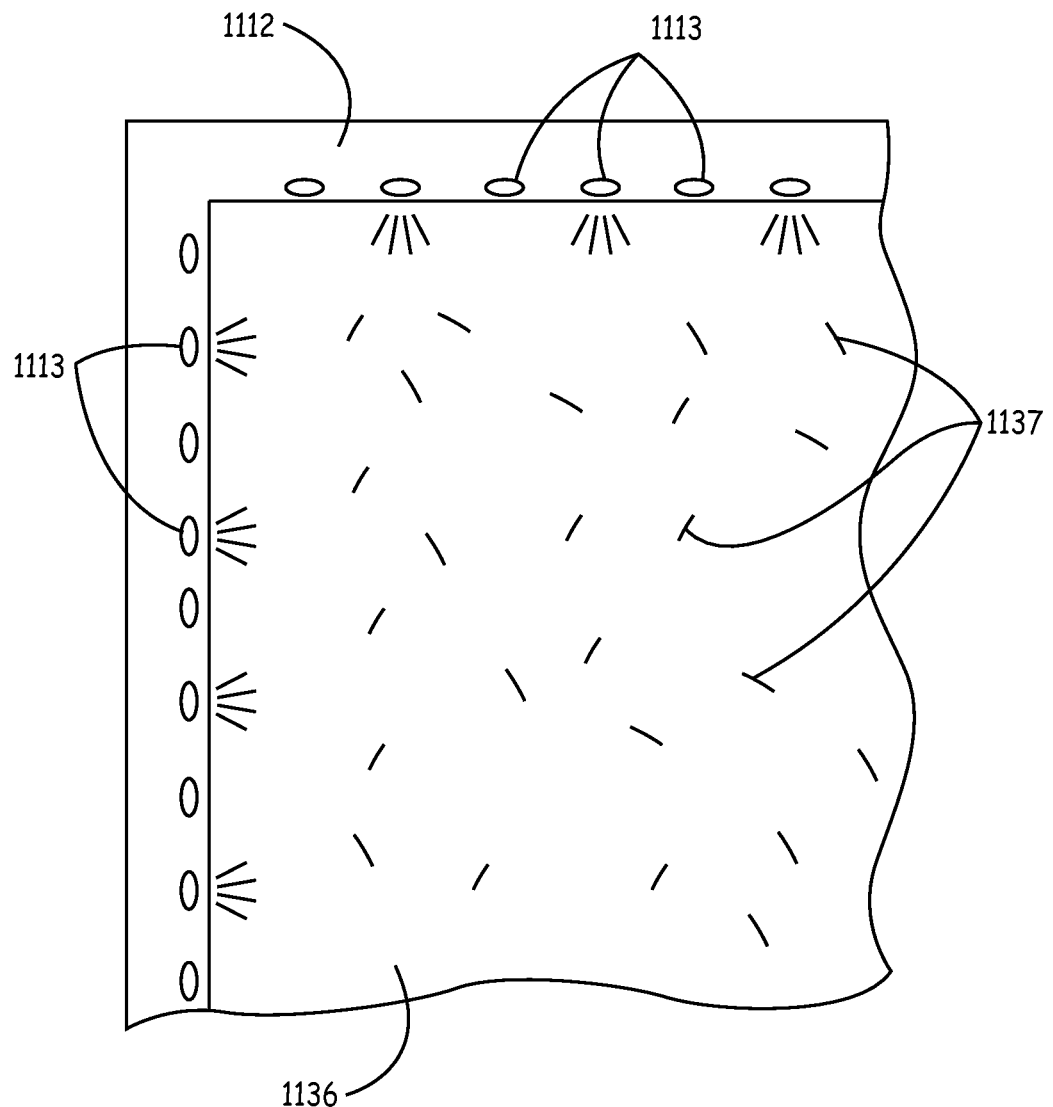
FIG. 12 is a simplified schematic diagram of a lighting scheme for a table type multitouch device.
Figure 13:
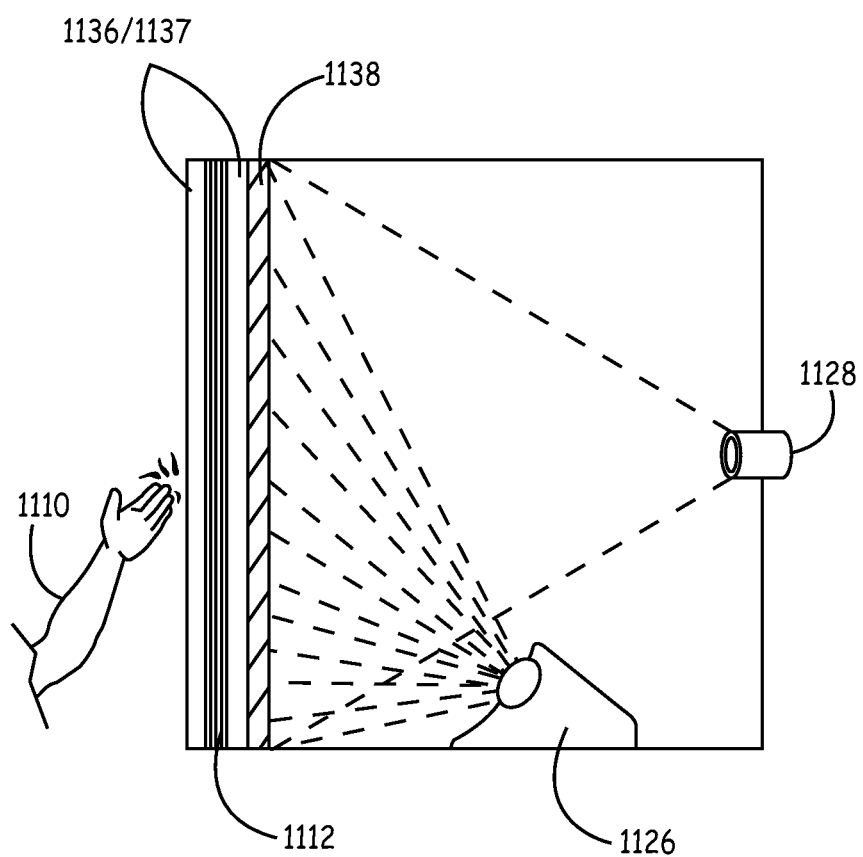
FIG. 13 is a cross-sectional view of the table type multitouch device of FIG. 11.

FIGS. 11, 12, and 13 illustrate yet another embodiment of a multitouch device, device 1100. In one embodiment, device 1100 is a table type multitouch device and has a smaller form factor than the devices shown in FIGS. 2, 4, 6, 8, 9, and 10. For instance, device 1100's width 206 and height 204 are illustratively each in the range of one to four feet.

In one embodiment, the screen 1102 of device 1100 is surrounded on all four of its sides by light sources 1112. FIG. 12 is a simplified schematic drawing showing screen 1102 and light sources 1112 in more detail. Screen 1102 includes a transparent material 1136 (e.g. glass or plexiglass) and many small reflectors 1137 (e.g. small pieces of aluminum or chrome) embedded and disbursed throughout material 1136. Reflectors 1137 illustratively have random orientations such that they reflect light in all directions. In one embodiment, light source 1112 is a ribbon of light emitting diodes 1113. In one specific example, for illustration purposes only and not by limitation, diodes 1113 are three quarter inch infrared LEDs. Embodiments are not however limited to any particular type of light source. Light source 1112 generates light (e.g. IR light) that is transmitted through transparent material 1136 and is reflected by reflectors 1137. Light source 1112 is illustratively chosen such that light is transmitted throughout the entire volume of the screen (i.e. throughout its entire width by height by thickness).

FIG. 13 is a simplified cross-sectional or side view of device 1100. As is shown in the figure, a projector 1126 projects an image onto a backing/screen material 1138 that is attached to the back of glass 1136 having embedded reflectors 1137 (shown in FIG. 12). A user 1110 interacts with images on the screen by touching the surface of the screen. When user 1110 touches the screen, light collects or becomes concentrated at the point of contact (i.e. the area of the screen being touched). Imaging camera 1128 illustratively has a field of view that covers the entire surface of the screen and is able to detect any touches (i.e. it is able to image the concentrated areas of light). For instance, in the case of light source 1112 generating infrared light, camera 1128 is optionally an infrared camera or a camera equipped with an IR filter.

In FIG. 13, device 1100 is shown as having only one projector 1126 and one imaging camera 1128. In other embodiments, device 1100 may have multiple projectors 1126 and/or multiple imaging cameras 1128 as is needed. Additionally, multiple devices 1100 are illustratively connected together and function as a single unit. For instance, up to five devices 1100 are optionally connected together and function as a single unit.

Figure 14:
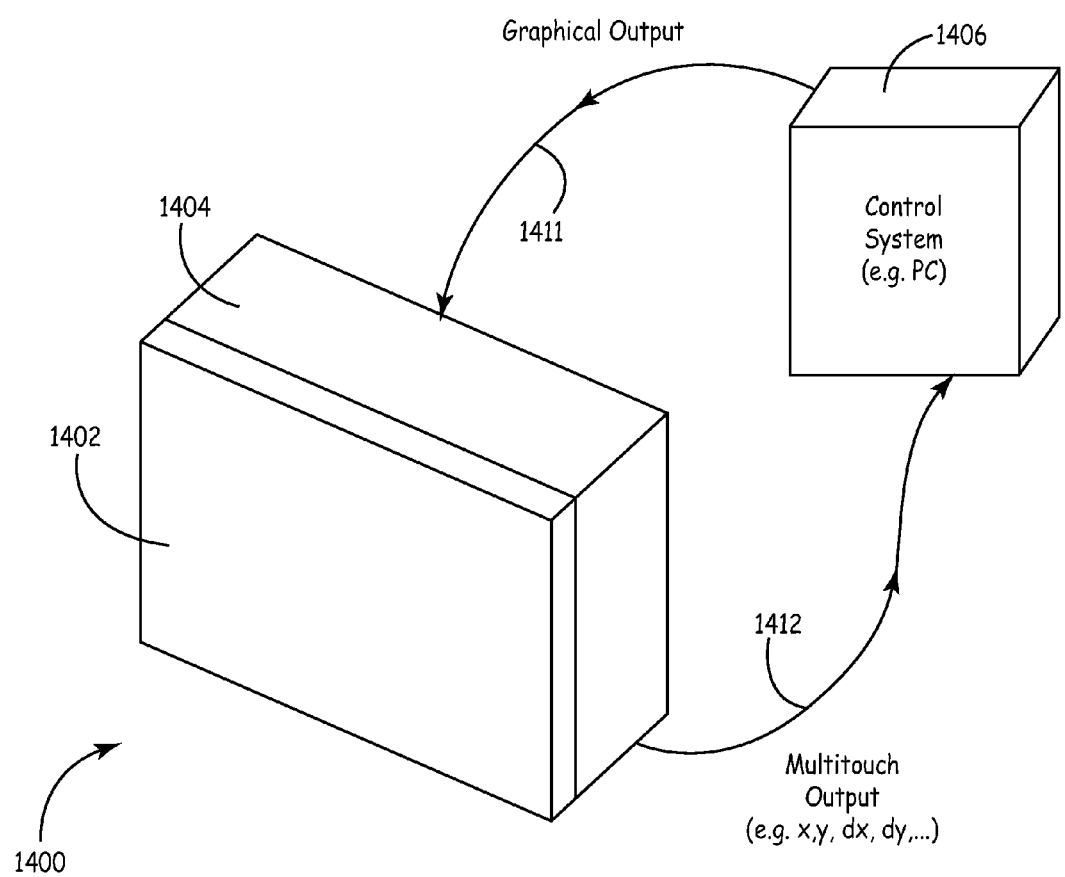
FIG. 14 is a perspective view of a capacitive multitouch system.

The multitouch devices shown in the previous figures have been vision based multitouch systems in that they detect touches utilizing optical imaging. Embodiments of the present disclosure are not however limited to only vision based systems. Embodiments are illustratively incorporated in or practiced with any type of multitouch device. FIG. 14 illustrates another type of multitouch system, a capacitive system 1400.

In the example shown in FIG. 14, a multitouch capacitive screen overlay 1402 is positioned in front of a television or monitor 1404. In another embodiment, the multitouch capability and display device are not separate pieces and are illustratively integrated into one unit. A control system 1406 (e.g. a computer) is communicatively coupled to television/monitor 1404 and to multitouch screen overlay 1402. Control system 1406 generates graphical output 1411 that is transmitted to and displayed on television/monitor 1404. A user interacts with the graphics on television/monitor 1404 by touching capacitive screen overlay 1402. Overlay 1402 then sends multitouch output 1412 back to control system 1406 that indicates the user's touches. Control system 1406 then uses the multitouch output 1412 to update its graphics and sends the updated graphics back to television/monitor 1404.

Figure 15:
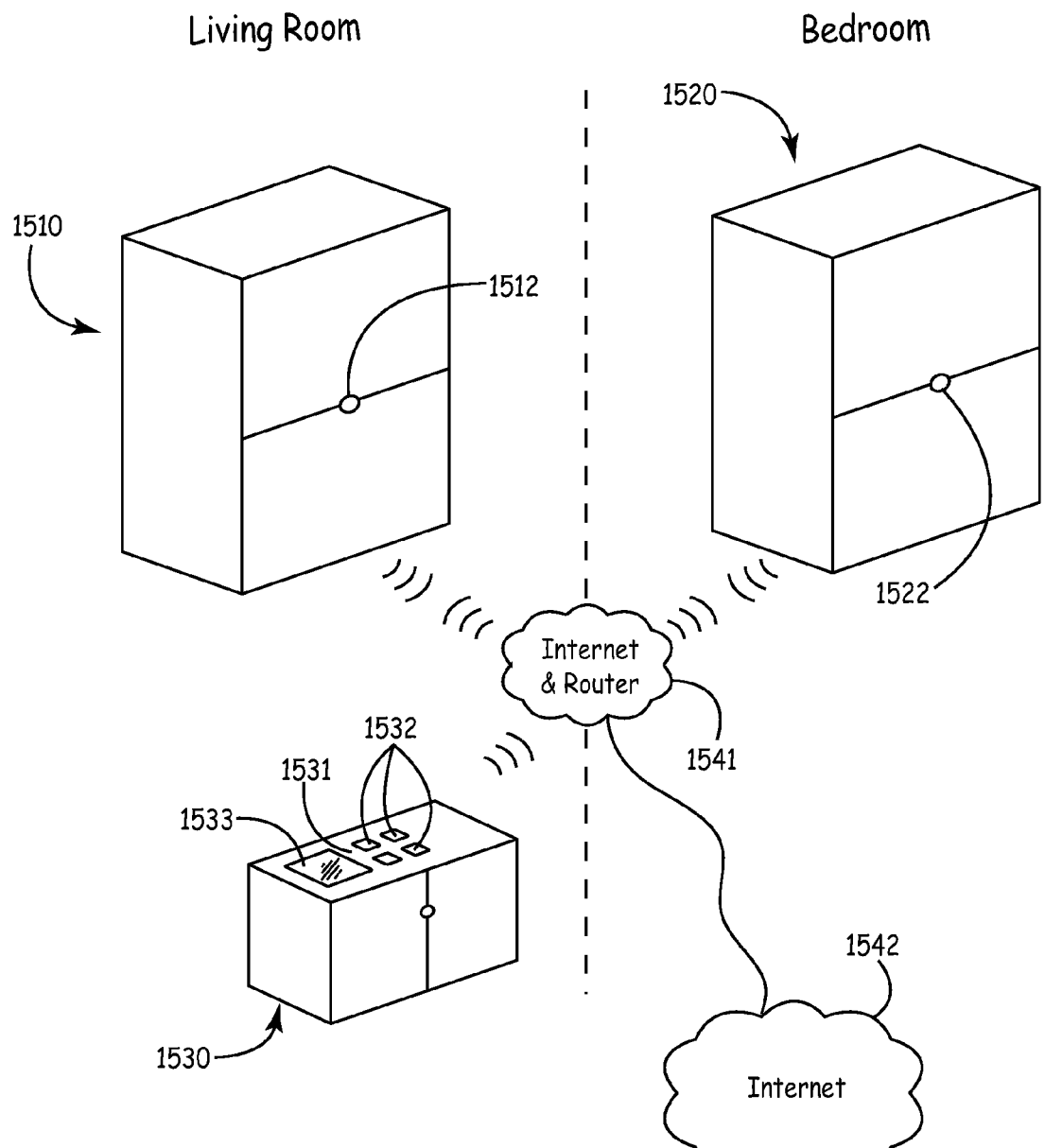
FIG. 15 is a schematic diagram of a multitouch environment that incorporates multiple multitouch devices working together.

It is also worth noting that any number of multiple multitouch systems are illustratively communicatively coupled together and work to run applications. FIG. 15 illustrates one example of such an environment. The environment in FIG. 15 has three multitouch devices, a wall type device 1510 in a living room, a table type device 1530 in the living room, and a second wall type device 1520 in a bedroom. Devices are illustratively coupled to each other through an intranet/router 1541 and are also coupled to the internet 1542.

In one embodiment, the screen 1531 of table device 1530 has multiple windows, windows 1532 and window 1533. Window 1533 illustratively includes television programming or guide information such as, but not limited to, a listing of television stations and an indication of what programs will be on the stations at different times and dates. Windows 1532 are illustratively television program windows. For example, a user may select four different programs from guide window 1533 and each of the four programs is displayed in its own window 1532. The user could then control what is being displayed on the screens of the wall type devices 1510 and 1520. For instance, a user could touch one of windows 1532 and push or flick it in the direction of one of the wall devices, and the program being displayed in the window would then be displayed on the wall device. In another embodiment, table device 1530 generates audio output for headphones and the selection of one or more of windows 1532 generates one or more channels of headphone audio output (i.e. the audio corresponding to the television program being displayed in the selected windows). Additionally, the environment shown in FIG. 15 may have personal video recording capability, and a user is able to control the recording and playing of video utilizing the multiple multitouch devices. For example, for illustration purposes only and not by limitation, a user could touch the screen of table device 1530 to pause or rewind the program being displayed on wall device 1510.

The multiple multitouch device environment in FIG. 15 is not however limited to running any particular application and is illustratively used in running any application. Other illustrative applications include making or placing phone calls, making or placing video calls using optional cameras 1512 and 1522, controlling various aspects of the home (e.g. temperature, garage door), making drawings or doodles, doing homework, shopping or ordering (e.g. ordering a pizza), surfing the internet, and playing video games.

II. UNIVERSAL MULTITOUCH DRIVER

As was previously mentioned in reference to FIG. 1, multitouch device drivers commonly output their touch information in different formats or syntax. Their various types of outputs may also have different kinds of information. For example, one multitouch device driver may only output an x and a y coordinate of a touch, and another device driver may have x and y coordinates as well as a change in x and a change in y (i.e. dx, dy). These varying forms of multitouch output can make implementing multitouch applications difficult and/or costly. For example, if an application developer wants to make a multitouch application that can be used on multiple different types of multitouch devices, he may have to make and maintain several different versions of the same application, with each of the versions being specially tailored to accommodate for a particular device driver.

In one aspect of the present disclosure, a universal multitouch driver is provided that eliminates or reduces the need to specially tailor applications to multiple types of device drivers. The universal multitouch driver is able to receive and interpret the outputs of multiple different types of device drivers. The universal multitouch driver then converts the output it receives into a standardized format such that regardless of the format or type of information that it receives, it consistently outputs multitouch information in the same format and having the same type of information. Consequently, multitouch application developers do not have to make or maintain multiple versions of multitouch applications to implement an application across multiple types of multitouch devices. Instead, developers only need to make applications that are able to use the multitouch information from the universal multitouch driver.

Figure 16:
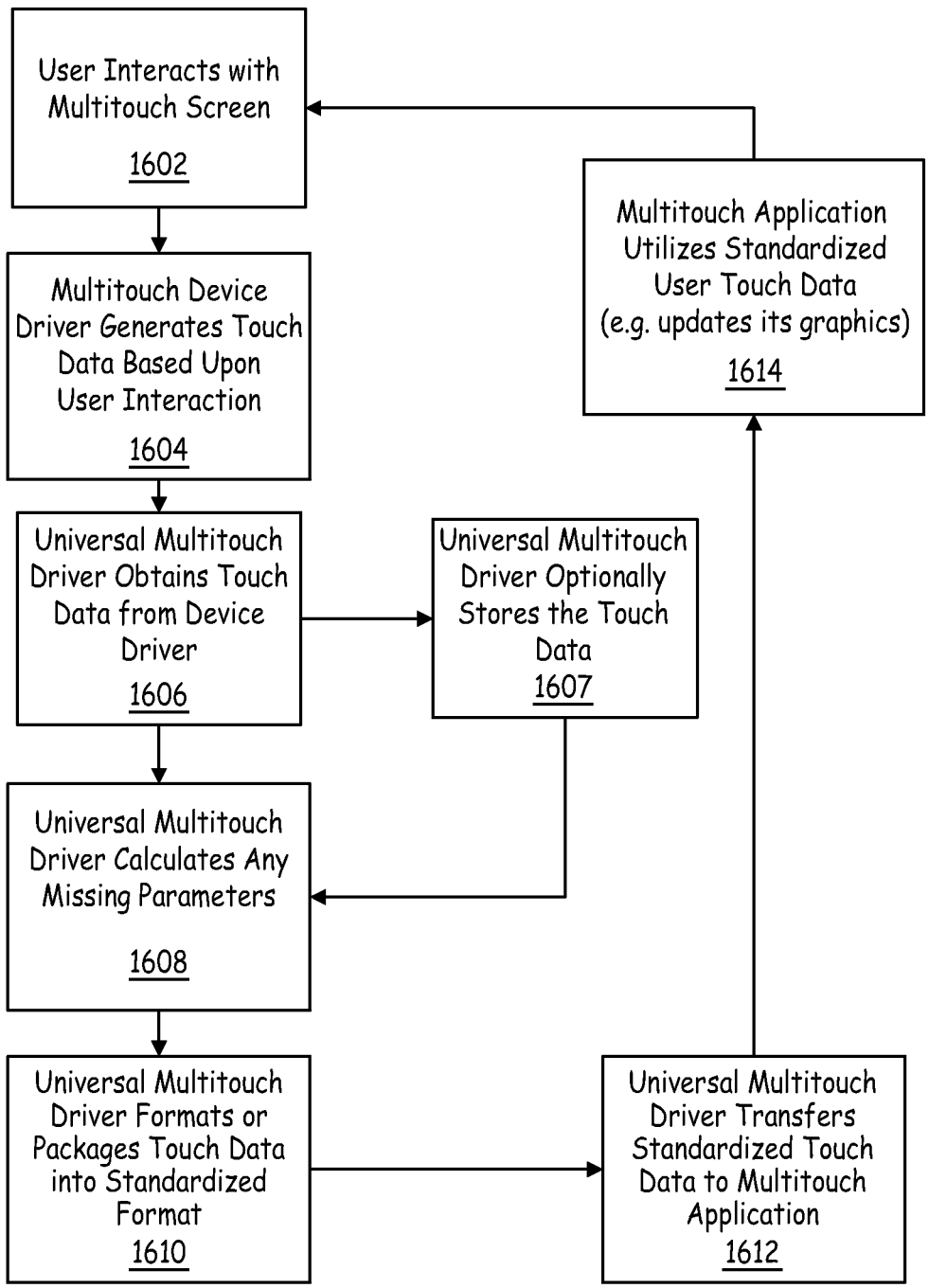
FIG. 16 is a block diagram illustrating the operation of a universal multitouch driver.

FIG. 16 is a block diagram illustrating the operation of a universal multitouch driver. At block 1602, a user interacts with a multitouch screen (e.g. the user touches the screen). At block 1604, a multitouch device driver generates touch data based upon the user interaction. As will be appreciated by those skilled in the art, this touch data can include several different parameters depending upon the device driver. Touch data commonly includes a touch identifier (e.g. touch #1, touch #2, etc.) and x-axis and y-axis coordinates that correspond to the location on the multitouch screen that was touched. Touch data may also include other types of information such a change in the x-axis coordinate from the previously sent data (e.g. dx), a change in the y-axis coordinate from the previously sent data (e.g. dy), a width of the touch (e.g. w), a height of the touch (e.g. h), and an acceleration (e.g. m).

At block 1606, the universal multitouch driver obtains the touch data from the device driver. In one embodiment, the device driver has an application programming interface, and the universal driver communicates with that interface to retrieve the data. In another embodiment, the device driver automatically sends the data to the universal driver. Embodiments are not limited to any specific manner of obtaining the data.

At block 1607, the universal multitouch driver optionally stores the data. For instance, the universal multitouch driver optionally stores the data to a volatile (e.g. DRAM) or non-volatile (e.g. flash or hard disk drive) memory.

At block 1608, the universal multitouch driver calculates any missing parameters. As was mentioned previously, different device drivers do not always output the same types of information. One device driver may for example only output a touch identifier, an x-axis coordinate, a y-axis coordinate, a width, and a height. Universal multitouch driver optionally retrieves the data stored at block 1607 and uses the current information and the stored information to generate a full set of touch data parameters (i.e. the touch identifier, x, y, dx, dy, w, h, and m). Alternatively or in addition to calculating missing parameters, the universal multitouch driver may fill in one or more missing parameters with a default value. For instance, if the device driver does not provide a width or a height, the universal driver illustratively uses a default value for those parameters (e.g. 0 or 1).

At block 1610, the universal multitouch driver formats or packages the touch data, including any calculated or default values, into a standardized format. In one embodiment, the standardized format follows the "User Datagram Protocol" or "UDP" network protocol. In another embodiment, the standardized format follows the "Extensible Markup Language" or "XML" rules. In yet another embodiment, a universal multitouch driver formats the touch data and packages it using multiple different formats simultaneously (e.g. it packages the same touch data in both UDP and XML simultaneously). Embodiments are not however limited to any particular standardized format.

At block 1612, the universal multitouch driver transfers the standardized touch data to one or more multitouch applications. Embodiments are not limited to any particular method of transferring the data. For instance, the universal multitouch driver may send the data to the application, or alternatively the application may retrieve the data from the universal multitouch driver. In one specific example, for illustration purposes only and not by limitation, universal multitouch driver sends UDP formatted data to the UDP port 3000 and XML formatted data to the TCP port 3333. Also, as was previously alluded to, the universal multitouch driver may optionally transfer data in multiple ways simultaneously (e.g. it sends data to both port 3000 and 3333 simultaneously).

At block 1614, the multitouch application utilizes the standardized user touch data that it received from universal multitouch driver. The process then illustratively repeats itself and returns to block 1602 where a user interacts with a multitouch screen.

Figure 17:
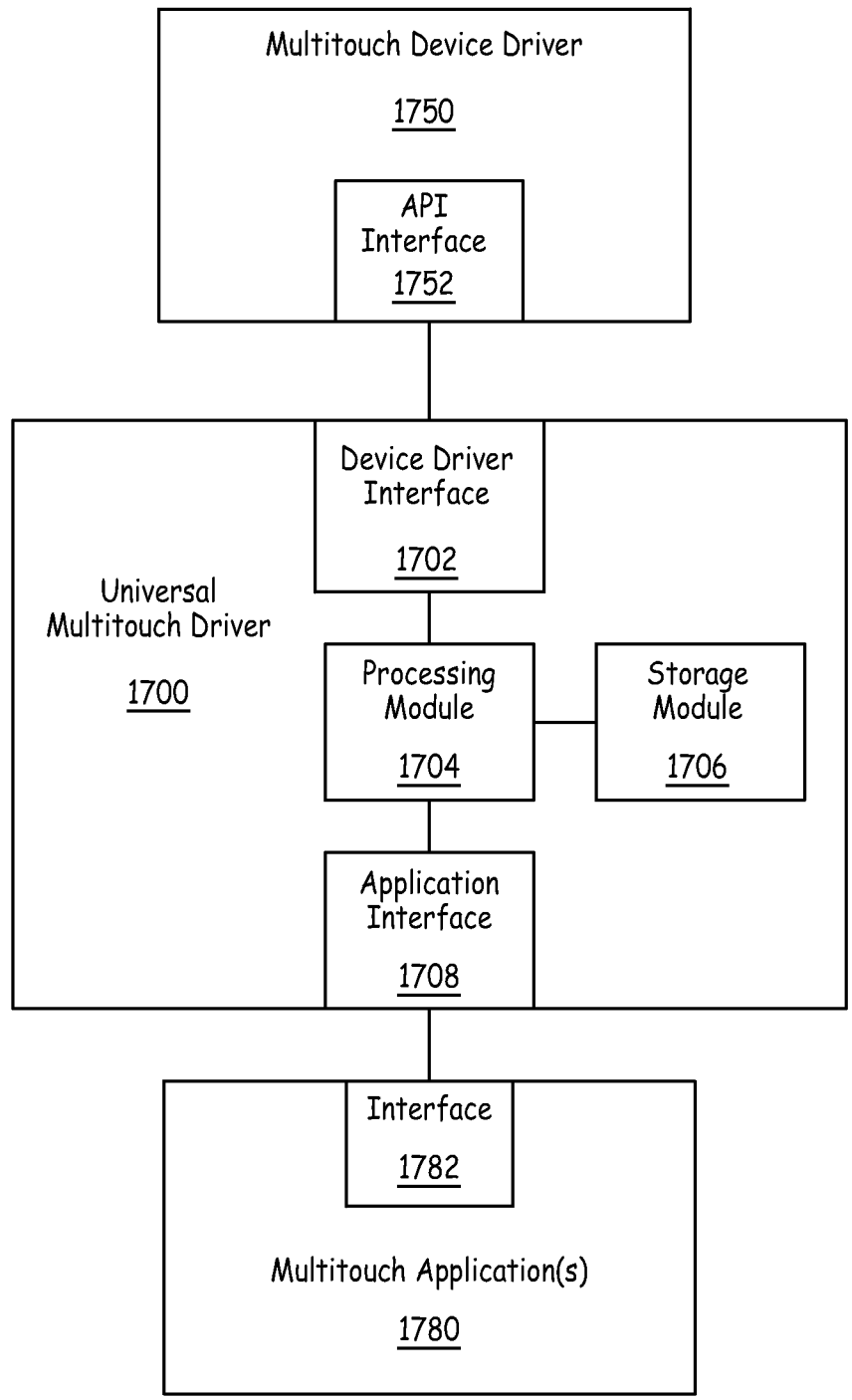
FIG. 17 is a schematic diagram of a universal multitouch driver.

FIG. 17 is a block diagram illustrating one embodiment of a universal multitouch driver 1700. Universal multitouch driver 1700 illustratively has a device driver interface 1702 that is communicatively coupled to an application programming interface 1752 of multitouch device driver 1750. In an embodiment, universal multitouch driver 1700 utilizes this connection to obtain the touch data from the device driver. Universal multitouch driver 1700 also has a processing module 1704 and a storage module 1706. Module 1704 is utilized in performing any computations, processing, or logical functions that may be required. For instance, processing module 1704 may perform calculations to determine additional parameters as was described in relation to block 1608 in FIG. 16. Storage module 1706 is utilized in performing any data storage, data management, or data retrieval functions such as, but not limited to, storing touch data to calculate change in x and change in y parameters (e.g. blocks 1607 and 1608 in FIG. 16). Universal multitouch driver then has an application interface 1708 that is communicatively coupled to an interface 1782 of one or more multitouch applications 1780. This connection is illustratively used in transferring (e.g. sending or transmitting) the standardized touch data to the multitouch applications.

The methods and the universal multitouch drivers described above illustratively help to reduce problems associated with implementing multitouch applications across multiple types of multitouch devices having various types of drivers. Instead of making and maintaining multiple versions of the same application, developers only need to make and maintain one version of any given application. It should be noted however that embodiments of the present disclosure are not limited to multitouch systems or environments having universal multitouch drivers. Embodiments are illustratively practiced without a universal multitouch driver, and applications illustratively receive touch data directly from device drivers. It should also be noted that in systems having a universal multitouch driver, the universal multitouch driver is optionally bypassable. For instance, in a situation in which the data from the device driver is already in a suitable format for an application, the data may bypass the universal multitouch driver and go directly to the application.

III. MULTITOUCH APPLICATIONS

Embodiments of the present disclosure also illustratively include a number of multitouch applications. These applications may be practiced in environments such as those previously discussed. The applications are however not limited to any particular environment and may also be practiced in environments different than those previously discussed.

The first application that will be discussed is illustratively an Application Launcher application. As will become more clear shortly, it is used to manage other applications on a multitouch device. FIGS. 18-1, 18-2, and 18-3 illustrate various states of Application Launcher, and FIGS. 19-1, 19-2, 19-3, 19-4, 19-5, and 19-6 illustrate multitouch gestures that may be used along with Application Launcher and the other applications disclosed herein.

Figures 1, 18:
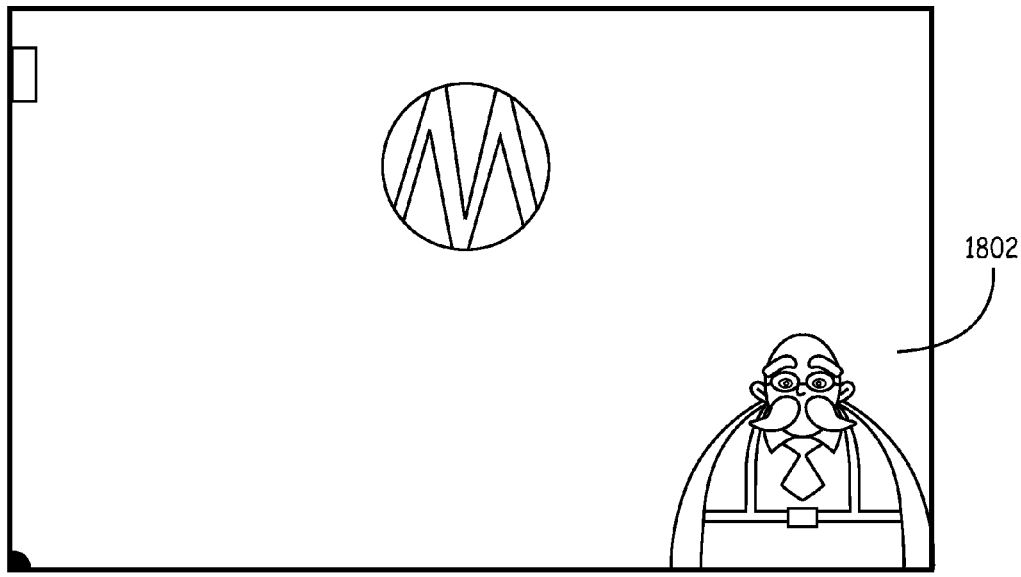
Figures 2, 18:
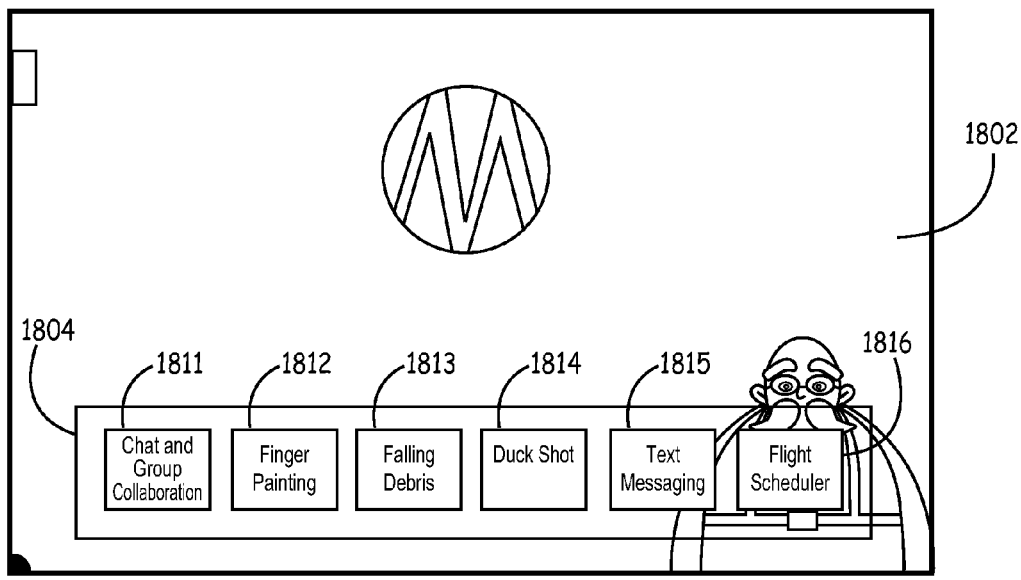
Figures 3, 18:
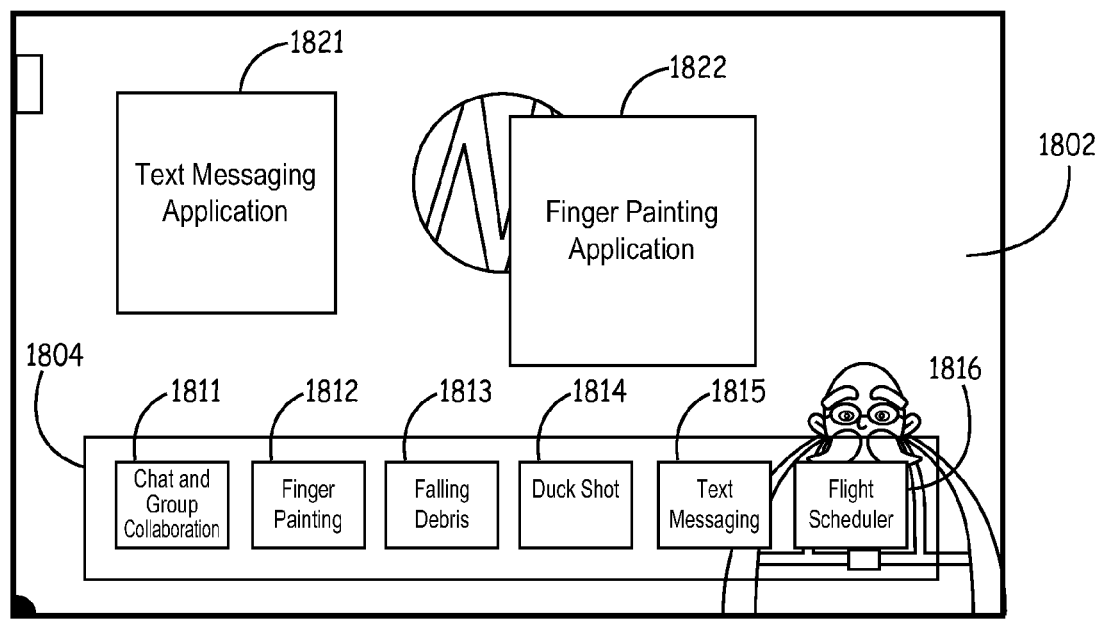
Figures 1, 19:
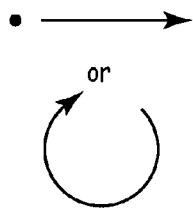
Figures 2, 19:
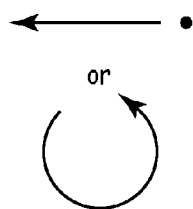
Figures 3, 19:
Figures 4, 19:
Figures 5, 19:
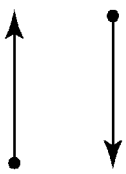
Figures 6, 19:
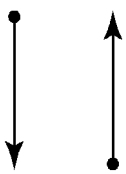

FIG. 18-1 shows Application Launcher from a state in which it is only showing background graphics or wallpaper 1802 on the screen of a multitouch device. In one embodiment, graphics or wallpaper 1802 are animated. FIG. 18-2 shows Application Launcher from a state in which an application menu 1804 has been activated. FIG. 19-1 shows two alternative gestures that may be used to activate the application menu. One of the gestures includes a single touch (e.g. a tap) followed by a touch that makes a line to the right. The other illustrative activation method includes making a clockwise rotation gesture on the screen.

Application menu 1804 illustratively has multiple icons that correspond to other applications that may be ran on the multitouch device. In the example shown in FIG. 18-2, application menu 1804 includes icons corresponding to or representing six applications. They are a Chat and Group Collaboration application 1811, a Finger Painting application 1812, a Falling Debris Game application 1813, a Duck Shot Game application 1814, a Text Messaging application 1815, and a Flight Scheduler application 1816. Each of applications 1811-1816 are discussed in greater detail below. In the example shown in the figures, the applications have text based icons. However, in another embodiment, the icons are graphical icons that provide some indication of the corresponding applications (e.g. a picture of a plane for a flight scheduling application).

FIG. 18-3 shows Application Launcher from a state in which two applications are launched and displayed on the screen of a multitouch device. In the illustrative example shown in the figure, the first application that has been launched is in one window 1821 of the screen, and the second application that has been launched is in a second window 1822 of the screen. Each of the two applications was illustratively launched by tapping on the corresponding icon 1811-1816 in application menu 1804. In an embodiment, such as that shown in FIG. 18-3, multiple multitouch applications are able to be ran on one device simultaneously. Application Launcher illustratively manages and allocates system resources to enable the multiple simultaneous applications.

FIGS. 19-2, 19-3, 19-4, 19-5, and 19-6 show additional gestures that may be used in applications according to the present disclosure. FIG. 19-2 represents gestures for closing application menu 1804. The gestures are essentially the opposite of the gestures shown in FIG. 19-1 for opening or launching application menu 1804.

FIG. 19-3 represents a gesture for increasing the size of a window. A user illustratively uses two fingers to touch two spots on an object displayed on a multitouch screen and then keeps touching the screen with the fingers while moving the fingers away from each other. This gesture is illustratively able to make any window larger. For example, a user can increase the size of application windows 1821 and 1822, and application menu 1804. Additionally, in an embodiment, a user is able to use the gesture to magnify wallpaper or background graphics.

FIG. 19-4 represents a gesture for decreasing the size of a window or de-magnifying background graphics. A user illustratively uses two fingers to touch two spots on an object and then keeps touching the screen with the fingers while moving the fingers towards each other.

FIGS. 19-5 and 19-6 represents gestures for rotating windows or background graphics. The gesture in FIG. 19-5 corresponds to clockwise rotation, and the gesture in FIG. 19-6 corresponds to counter-clockwise rotation. As indicated in the figures, the gestures include touching two spots on the screen and moving the fingers together while making parallel lines.

FIGS. 20-1, 20-2, 20-3, 20-4, and 20-5 show several illustrative examples of graphical user interfaces (e.g. screenshots) for a multitouch Chat and Group Collaboration application. The application is illustratively launched by selecting the corresponding icon 1811 from Application Launcher application menu 1804 (shown in FIG. 18).

Figures 1, 20:
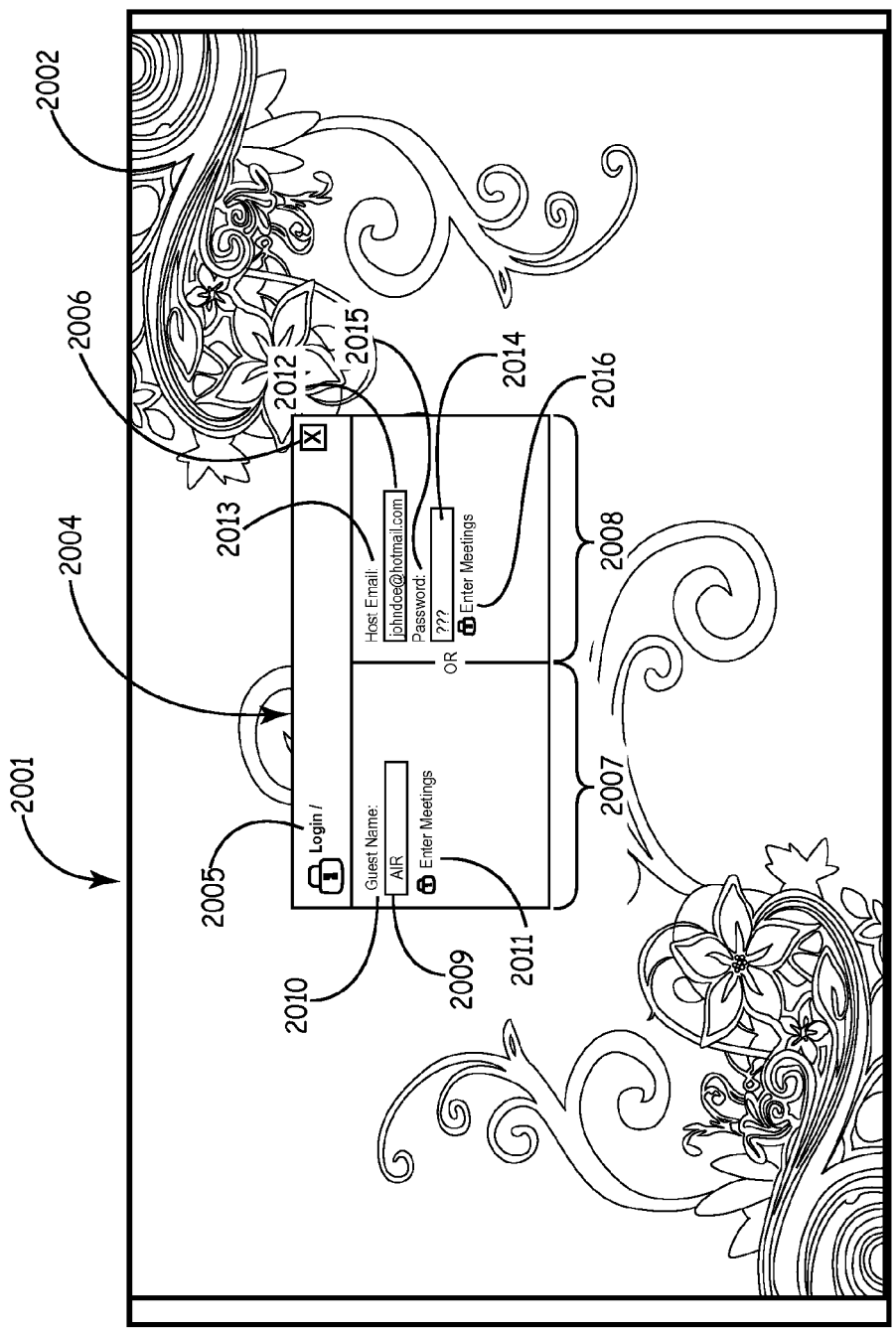
Figures 2, 20:
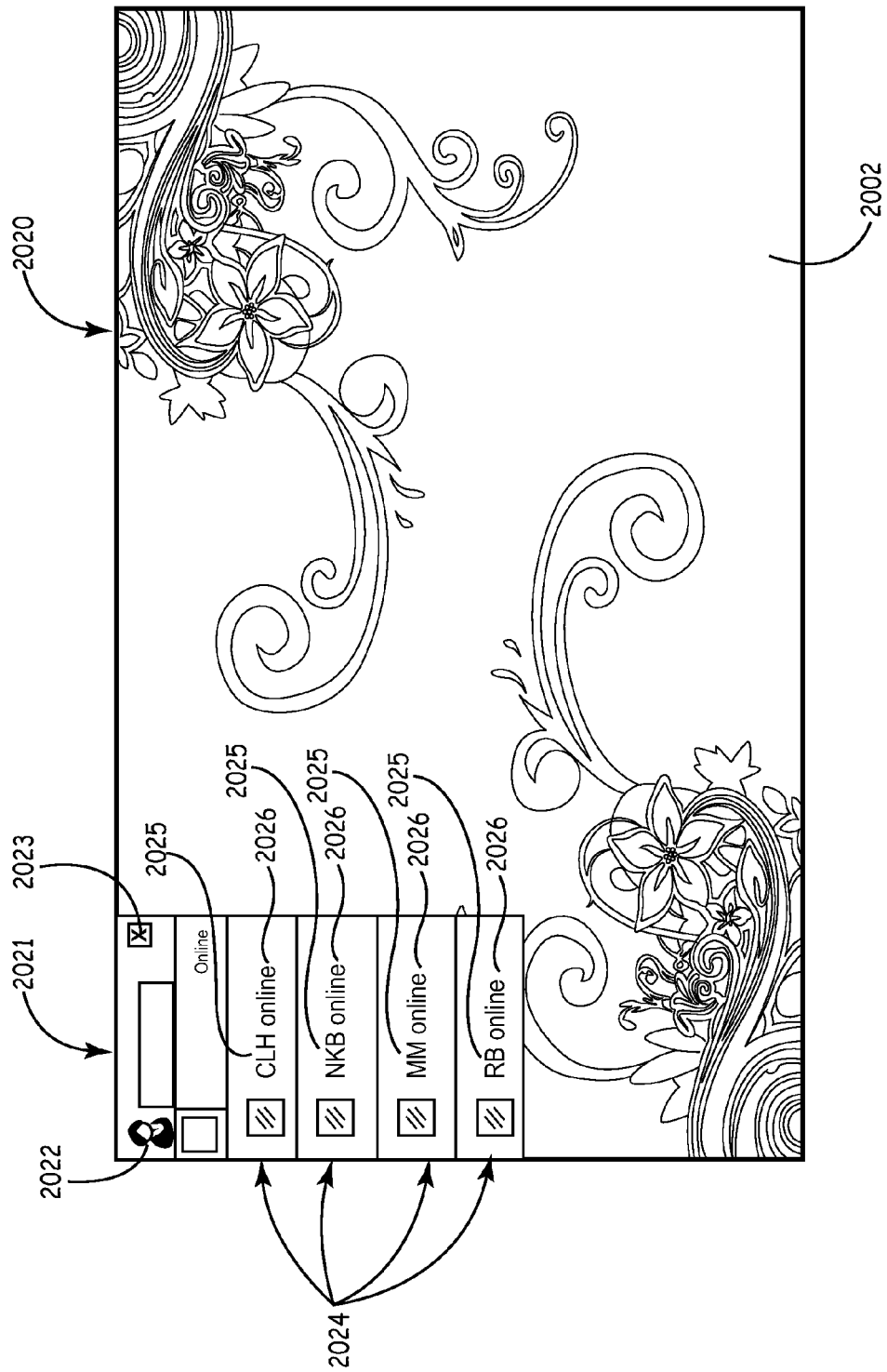
Figures 3, 20:
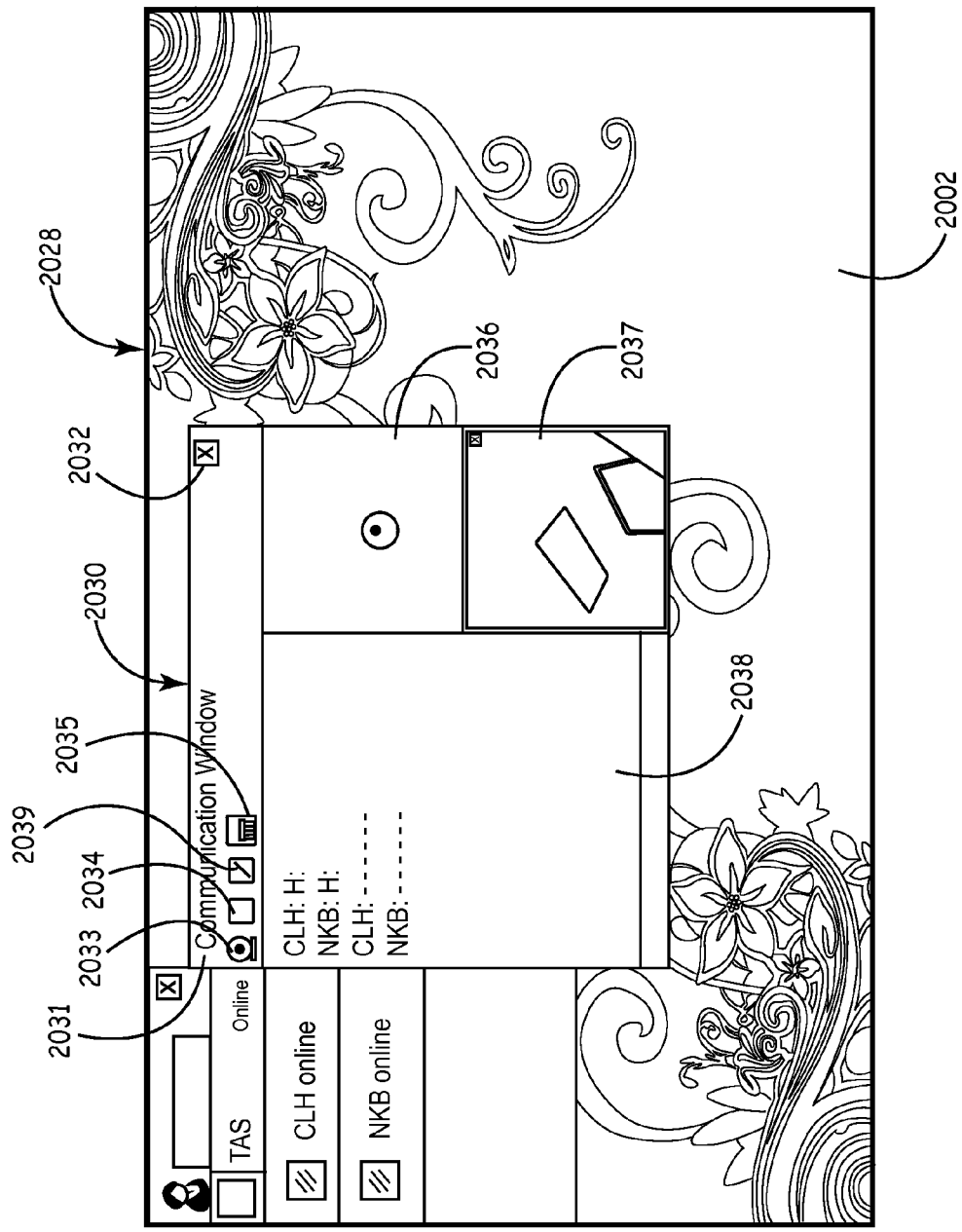
Figures 4, 20:
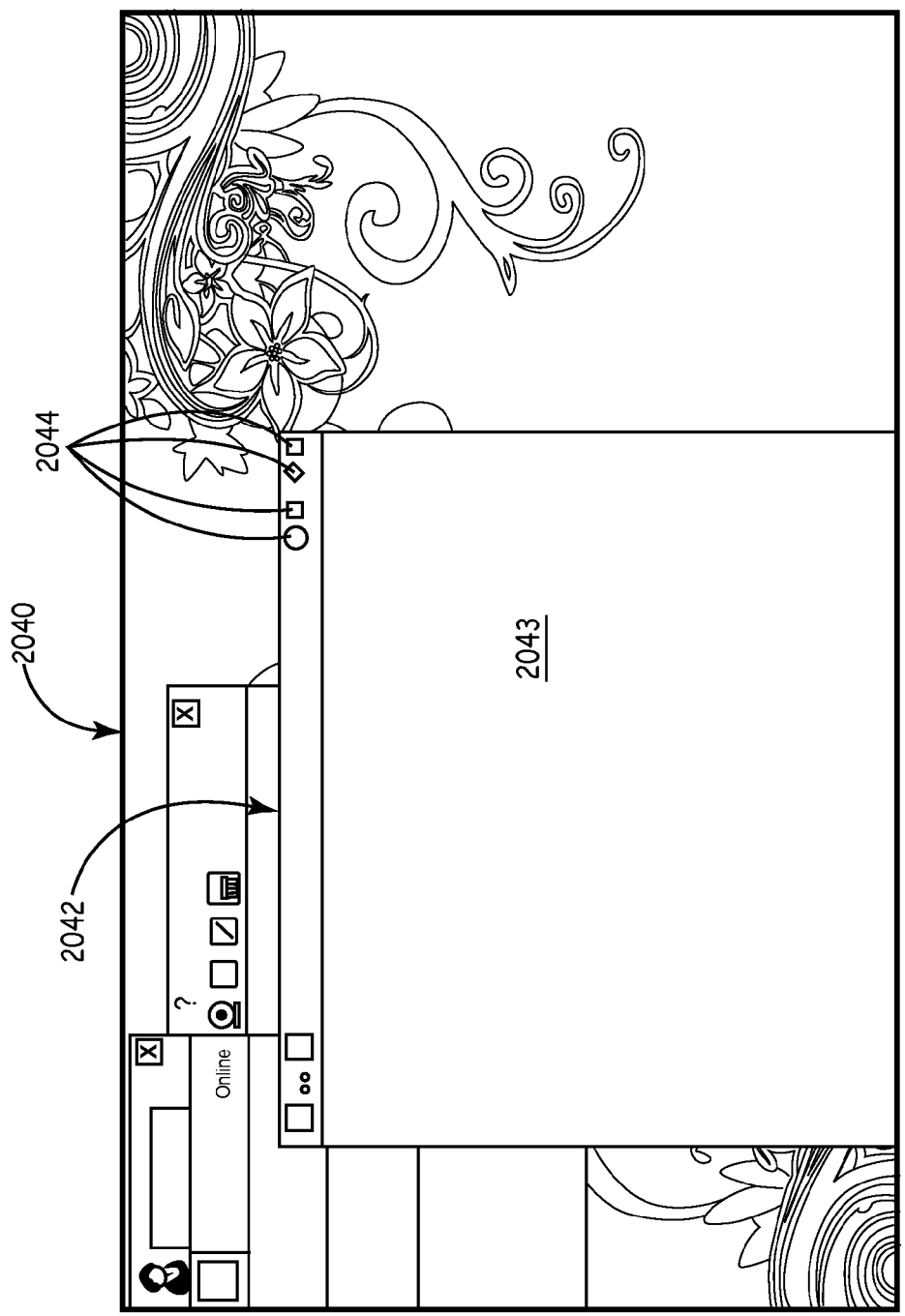
Figures 5, 20:
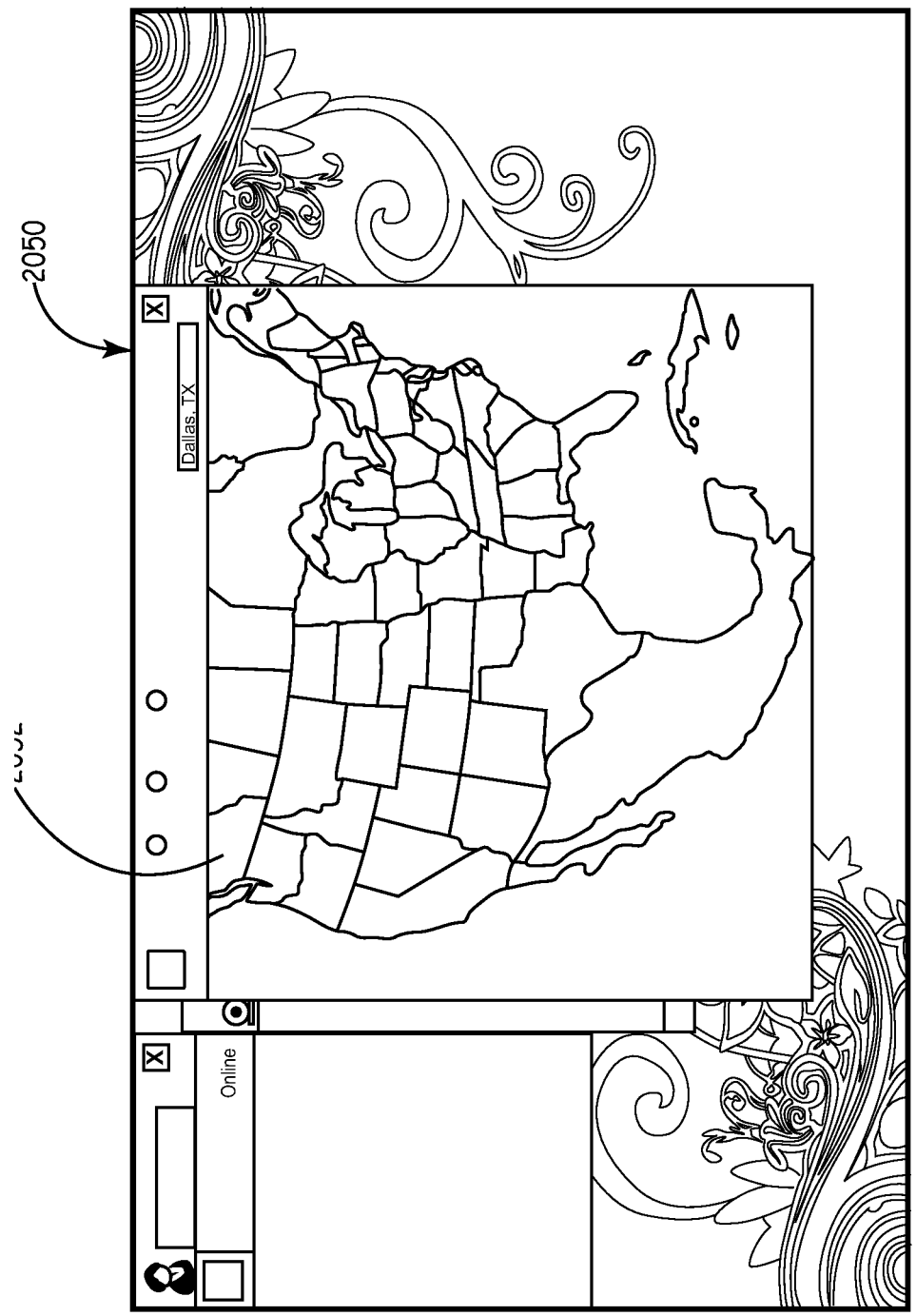

FIG. 20-1 shows a first user interface 2001 that is illustratively utilized to log a user into the application. The log in user interface 2001 includes background graphics 2002 and a log in window 2004. Background graphics 2002 can include any graphics desired by the user. Background graphics 2002 may also optionally include animated graphics. Log in window 2004 is illustratively used to collect information from a user such that the application is able to identify the user. This may be useful for example for retrieving a users saved information (e.g. saved preferences, friend list, etc.) or for restricting access to the application to only certain people (e.g. paying subscribers to the service). Embodiments of log in window 2004 may have any features and collect any type of information. In the specific example shown in FIG. 20-1, log in window 2004 has a title or header 2005, a closing button 2006, a first side or portion 2007 that enables a user to log into the application as a guest (e.g. a person that enters another person's meeting), and a second side or portion 2008 that enables a user to log into the application as a host (e.g. a person holding a meeting that others attend). The guest portion 2007 has a guest user input field 2009 to collect identifying information (e.g. a user name or handle) from a person logging in as a guest, a label or header 2010 that describes or identifies input field 2009, and a button 2011 to submit the user's identifying information and to log into the application as a guest. The host portion 2008 has a host user input field 2012 to collect identifying information (e.g. username, email address, handle, etc.) from a user who wishes to log in as a host, a label or header 2013 that describes or identifies input field 2012, a second host user input field 2014 that collects authentication information (e.g. a password, PIN, etc.), a label or header 2015 that describes or identifies input field 2014, and a button 2016 to submit the user's identifying/authentication information and to log into the application as a host.

FIG. 20-2 shows a second user interface 2020 of the Chat and Group Collaboration application. Interface 2020 is illustratively displayed once a user has submitted his identification and/or authentication information to the application through a log in window (e.g. through log in window 2004 in FIG. 20-1), and the application has successfully verified the information (e.g. that the user is a registered user). Interface 2020 include a user list window 2021. Window 2021 has an identification label or header 2022 that helps a user understand what window 2021 is, a closing button 2023 to close window 2021, and multiple user identification fields 2024. Each user identification field 2024 includes a text and/or image user identifier 2025 (e.g. a user name, a real name, a picture of the user, a handle, etc.) and a status field 2026 that indicates a status of the user (e.g. online/available or offline/not available).

FIG. 20-3 shows a third user interface 2028 of the Chat and Group Collaboration application. Interface 2028 is illustratively displayed once a user has selected (e.g. touched) one or more of the user identification fields 2024. Upon the selection of a user, a corresponding communication window 2030 is displayed on the interface. Communication window 2030 includes an identification field or header 2031 that describes a window (e.g. it identifies a selected user) and a closing button 2032 to terminate the communication session with the selected user. Communication window 2030 further has multiple buttons, 2033, 2034, and 2035 that allow a user to select various methods of communicating with the selected user. Button 2033 corresponds to communicating by video. Button 2034 corresponds to communicating by voice, and button 2035 corresponds to communicating by text. One or more buttons are optionally selected to communicate with the selected user using the corresponding methods. Window 2030 further optionally includes two video portions 2036 and 2037, and a text portion 2038. Video portions 2036 and 2037 may be used for video communication. For example, one of the portions may show video of the selected user, and the other one of the portions may show the user's own video that is being transmitted to the selected user. Text portion 2038 may be used for communicating by text. Portion 2038 may include, for example, a series of type written messages along with identifiers that show which user generated each of the messages.

It is worth mentioning again that in an embodiment, that the Chat and Group collaboration application, as well as the rest of the applications described in this specification, have multitouch capabilities. The applications illustratively support the use of multitouch gestures such as, but not limited to, those shown in FIGS. 19-1, 19-2, 19-3, 19-4, 19-5, and 19-6. This allows for windows, backgrounds, and any object within an application to be manipulated or controlled by the multitouch gestures. For instance, windows can be increased or decreased in size or rotated utilizing multitouch gestures.

Window 2030 in FIG. 20-3 further includes a drawing button 2039 that enables users to communicate by drawing images on their multitouch screens. Upon selection of button 2039, the user interface 2040 shown in FIG. 20-4 is illustratively displayed. Interface 2040 includes a drawing window 2042. Window 2042 has a multitouch shared drawing area 2043. Drawing area 2043 is a shared object in that the same image of area 2043 is displayed on the multitouch screens of each of the users logged into the application (i.e. users can see what other users draw). Window 2043 further optionally has multiple buttons 2044 that provide additional features. Buttons 2044 may include features that are useful in drawing in area 2043. For instance, buttons 2044 may include a button to draw in area 2043 in a pencil or pen format, a button to draw in area 2043 with a paint brush format, and/or a button to draw in area 2043 with a spray paint format.

FIG. 20-5 shows another user interface 2050 that may be included with a Chat and Group collaboration application. Interface 2050 includes a map window 2052. Map window 2052 is illustratively shared amongst all of the users logged into the system. Each user is able to control or manipulate the map shown in the window by using multitouch gestures. For instance, users may zoom in on a location utilizing the gesture shown in FIG. 19-4, zoom out on a location utilizing the gesture shown in FIG. 19-3, and/or rotate the view of a location utilizing the gestures shown in FIGS. 19-5 and 19-6. Additionally, the window 2052 itself can be resized, rotated, etc. utilizing multitouch gestures.

Figures 1, 21:
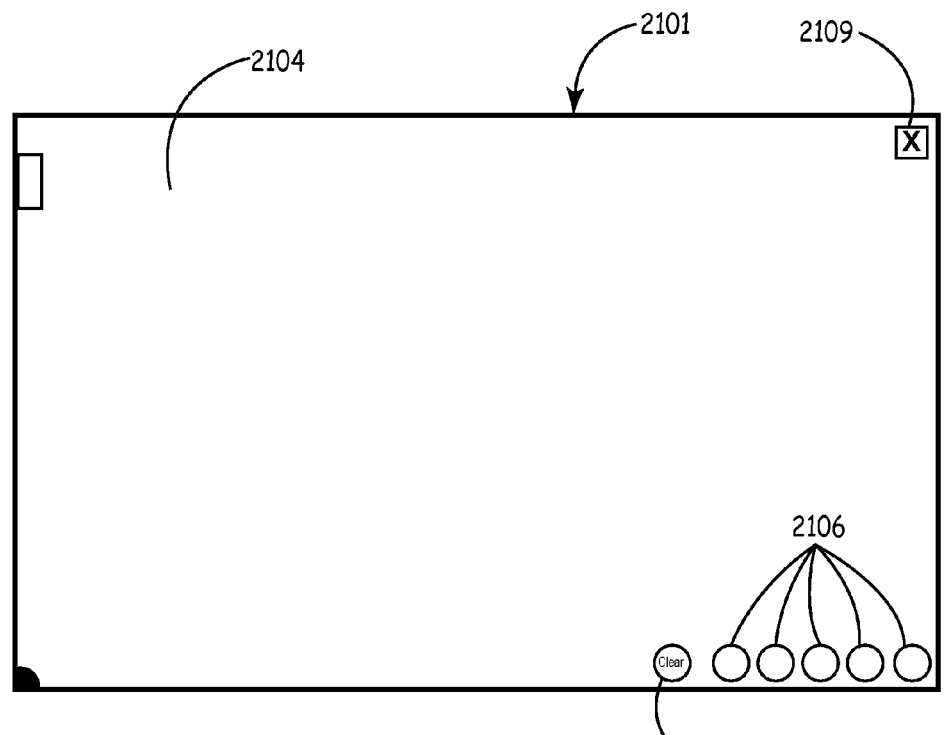
Figures 2, 21:
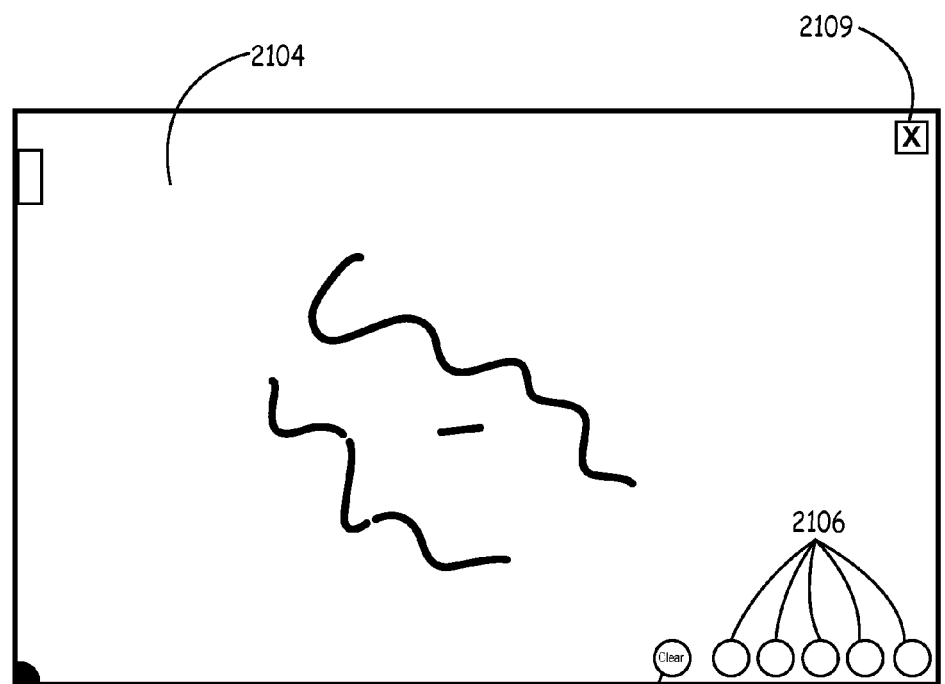

FIGS. 21-1 and 21-2 show graphical user interfaces of a multitouch Finger Painting application. The application is illustratively launched by selecting the corresponding icon 1812 from the Application Launcher application menu 1804 (shown in FIG. 18). Interface 2101 in FIG. 21-1 shows the painting area 2104 of the user interface before anything has been painted in it, and interface 2102 shows the user interface after some squiggly lines have been painted in painting area 2104. Painting area 2104 illustratively has background graphics that look like a painting canvas or a piece of paper. Area 2104 however may include any type of graphics (e.g. one solid color).

Interfaces 2101 and 2102 include a plurality of color selection buttons 2106. A user illustratively selects one or more of the colors. The selected color is then activated, and when a user touches painting area 2104, it paints with the selected color. Interfaces 2101 and 2102 may also have additional buttons such as, but not limited to, a clear button 2108 to erase the painting/drawing in area 2104 and/or a closing button 2109 to terminate the application.

FIG. 22 shows a graphical user interface 2201 of a Falling Debris multitouch game application. The application is illustratively launched by selecting the corresponding icon 1813 from the Application Launcher application menu 1804 (shown in FIG. 18). In the game, falling debris 2202 move from the top of the interface towards the bottom of the interface. Debris 2202 have tails 2203 that represent the previous locations of the debris. The object of the game is for a user to trigger explosions 2205 to destroy the debris before they hit houses 2204. In an embodiment, explosions 2205 are triggered by a user touching the screen (i.e. an explosion occurs where the screen is touched). Given the multitouch capabilities of the application, a user is able to touch multiple spots on interface 2201 simultaneously, thus triggering multiple simultaneous explosions 2205.

Figure 23:
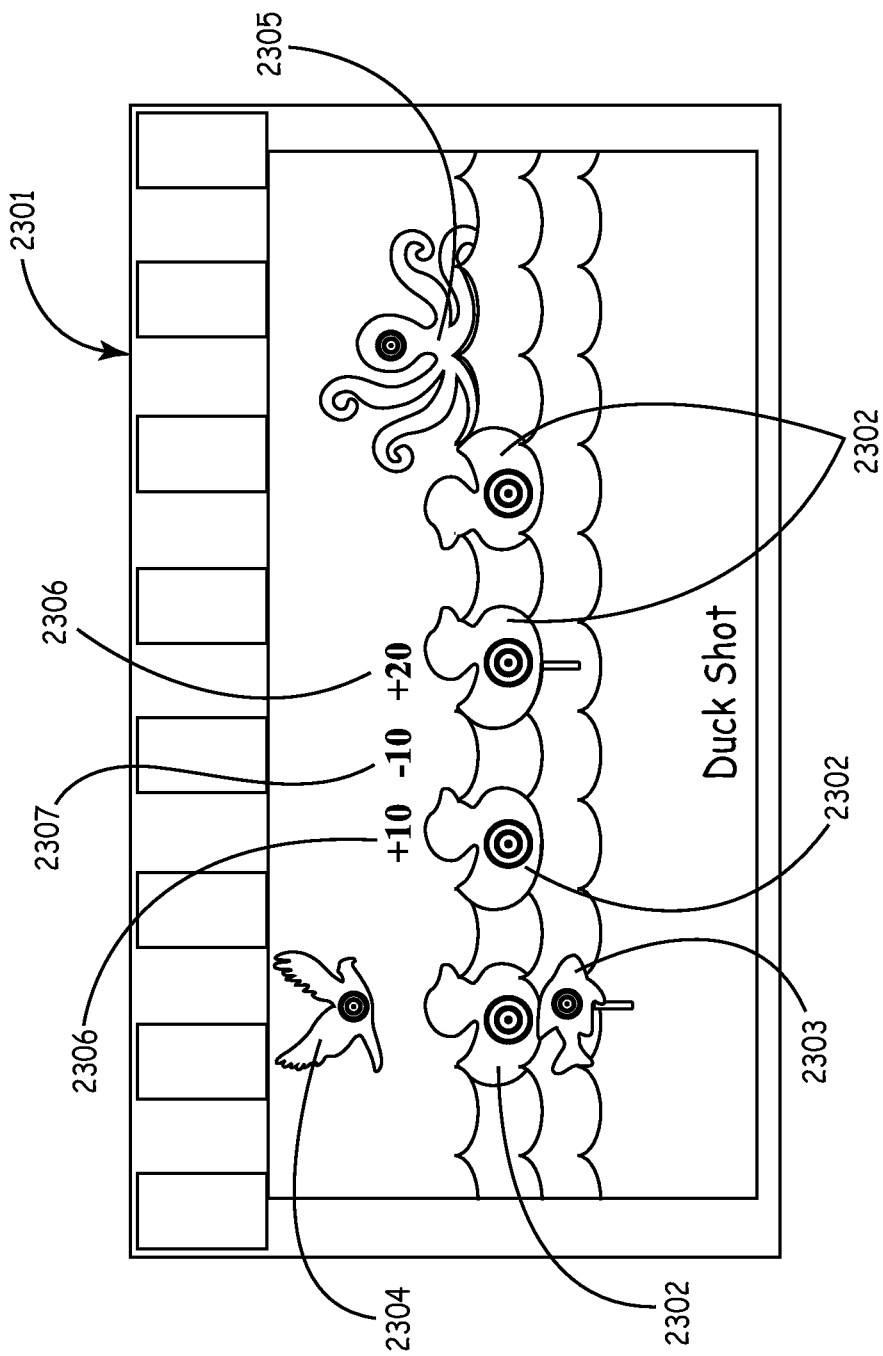
FIG. 23 is a screenshot of a Duck Shot multitouch application.

FIG. 23 shows a graphical user interface 2301 of a Duck Shot multitouch game application. The application is illustratively launched by selecting the corresponding icon 1814 from the Application Launcher application menu 1804 (shown in FIG. 18). In the game, different types of objects, such as, but not limited to ducks 2302, fish 2303, birds 2304, and/or octopuses 2305 intermittently are displayed on the interface. The objects optionally include targets or bulls eyes that indicate that they are to be "shot." In one embodiment, the application is displayed on a relatively large multitouch device (e.g. 80" by 46") and a user throws bean bags at the device's multitouch screen. In another embodiment, the application is displayed on a smaller multitouch device a user "shoots" the objects by touching the objects with his fingers. Upon a successful shot, interface 2301 illustratively display points 2306 that the user is awarded. Similarly, display 2301 may display negative points or points that are deducted 2307 from the user's score upon an unsuccessful shot. Because of the multitouch capability, a user is able to shoot multiple objects simultaneously and/or multiple users can play simultaneously with each of the users being able to shoot at the same time.

Figure 24:
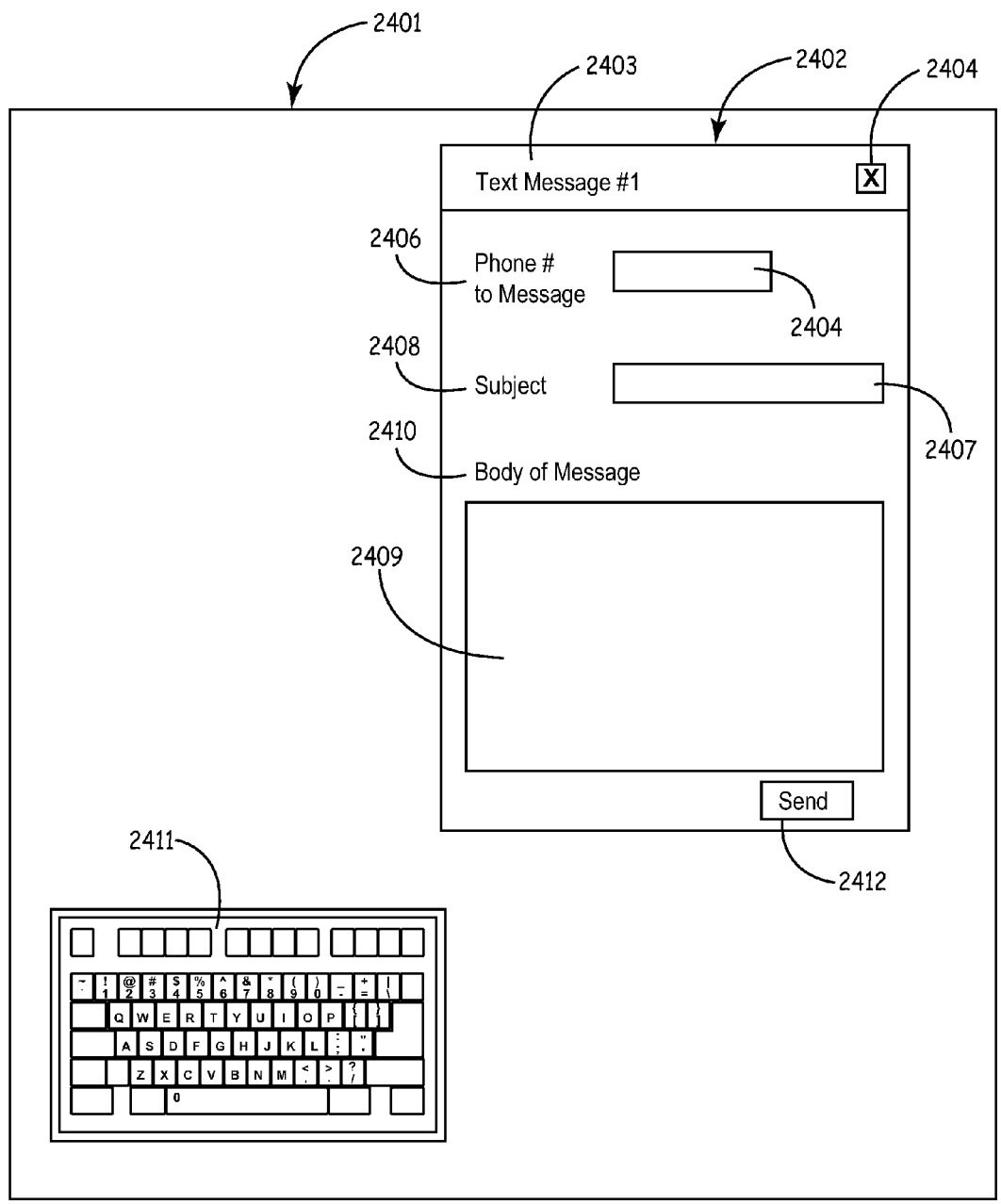
FIG. 24 is screenshot of a Text Messaging multitouch application.

FIG. 24 shows a graphical user interface 2401 of a Text Messaging multitouch application. The application is illustratively launched by selecting the corresponding icon 1815 from the Application Launcher application menu 1804 (shown in FIG. 18). The application illustratively includes two windows within its user interface. The first window 2402 is a text messaging window. In the example shown in the figure, text messaging window 2402 includes a label or header 2403, a closing button 2404, a phone number field 2405, a phone number field label 2406, a subject field 2407, a subject field label 2408, a message body field 2409, a message body field label 2410, and a button to send the message 2412. In other implementations, text messaging window 2402 may have more or fewer fields and labels than what is shown in the figure.

The second window in user interface 2401 is a user input window 2411. In the example shown in the figure, the user input window 2411 is a QWERTY keyboard that has multitouch capability (e.g. a user could touch the "Shift" key and a letter key to type the capitalized version of the letter). A user illustratively utilizes the multitouch QWERTY keyboard displayed on the screen to fill out fields 2405, 2407, and 2409 in the text messaging window 2402. User input window 2411 is not however limited to only QWERTY keyboards and illustratively includes any other type of input mechanism that can collect the required information from a user.

As was previously mentioned, all of the windows in all of the multitouch applications discussed in this specification have multitouch capabilities such as, but not limited to, resizing and rotating windows. In the case of the Text Message application, for example, both the user input window 2411 and the text messaging window 2402 are able to be resized, rotated, moved, etc. utilizing multitouch gestures.

Figures 1, 25:
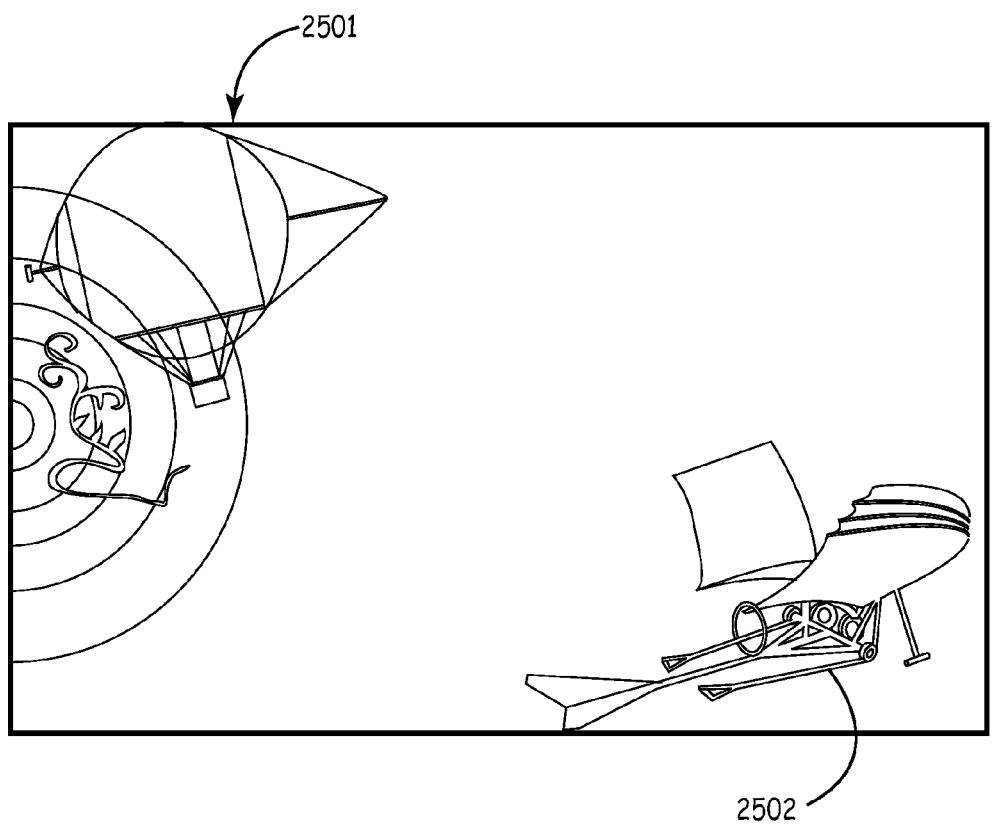
Figures 2, 25:
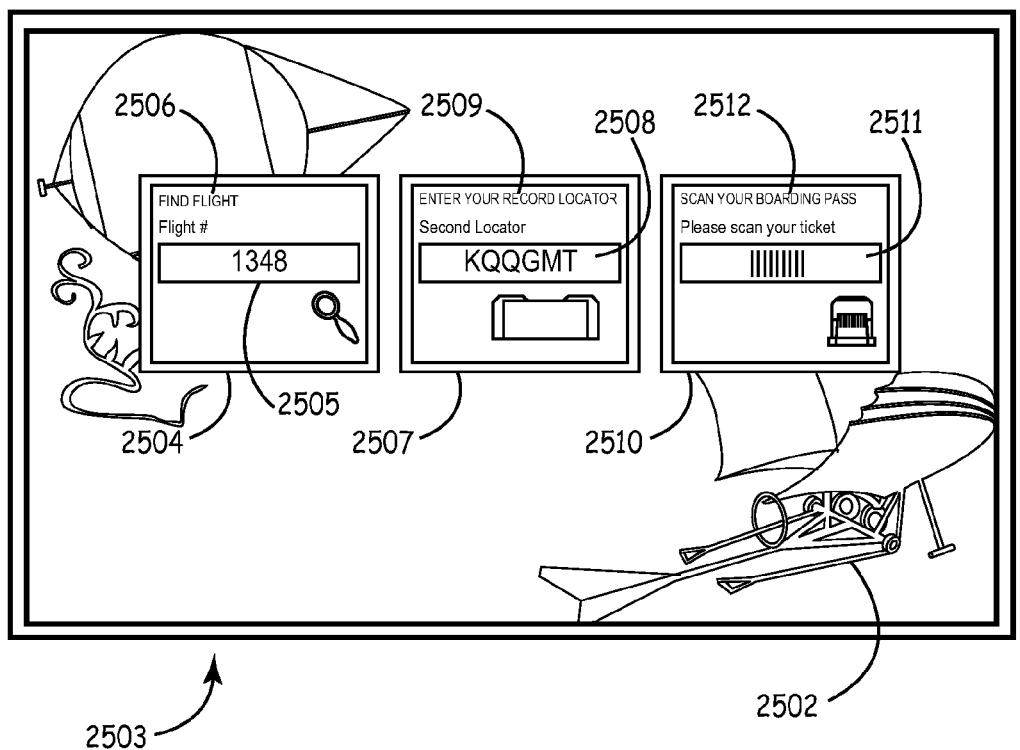
Figures 3, 25:
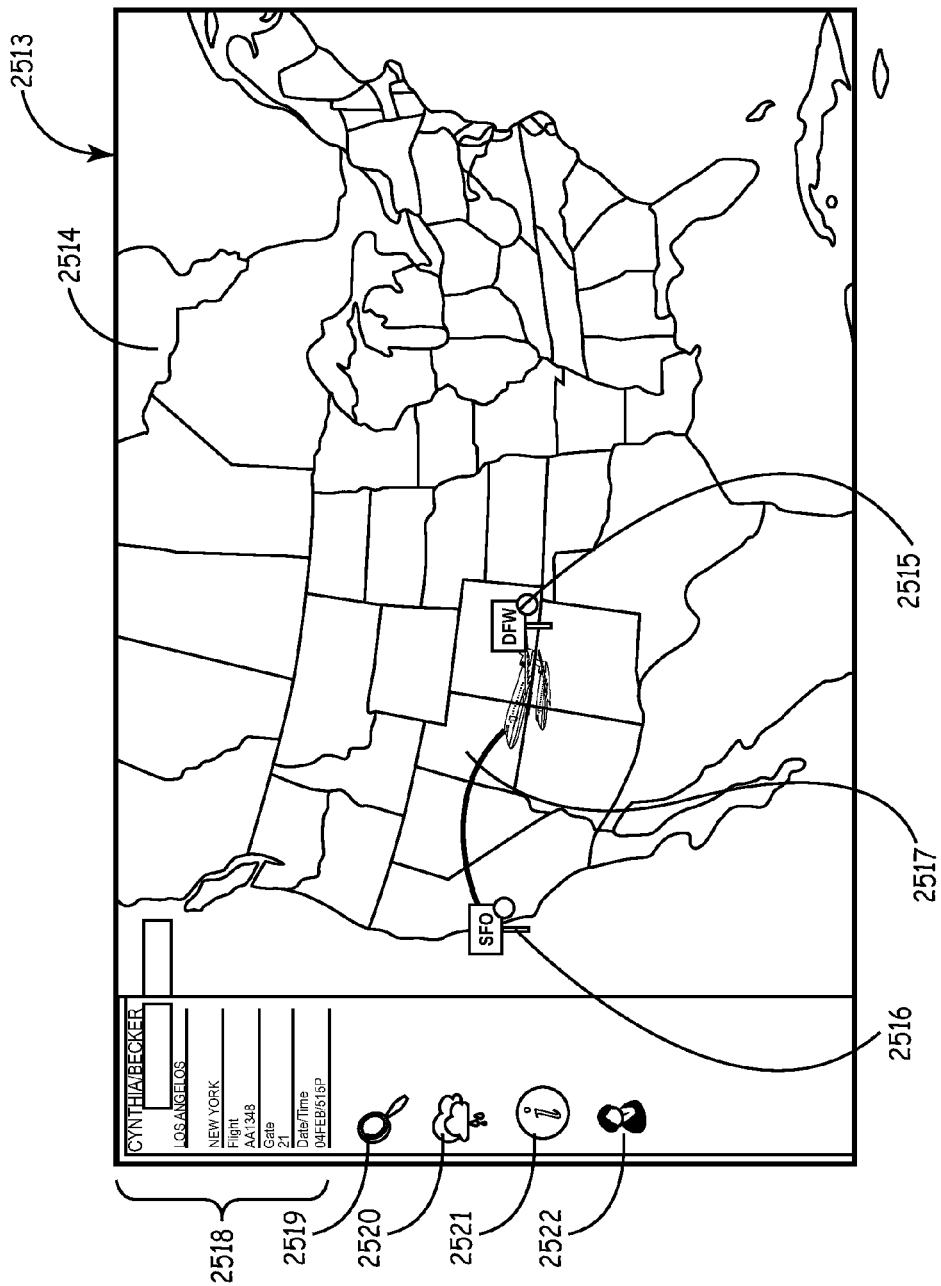
Figures 4, 25:
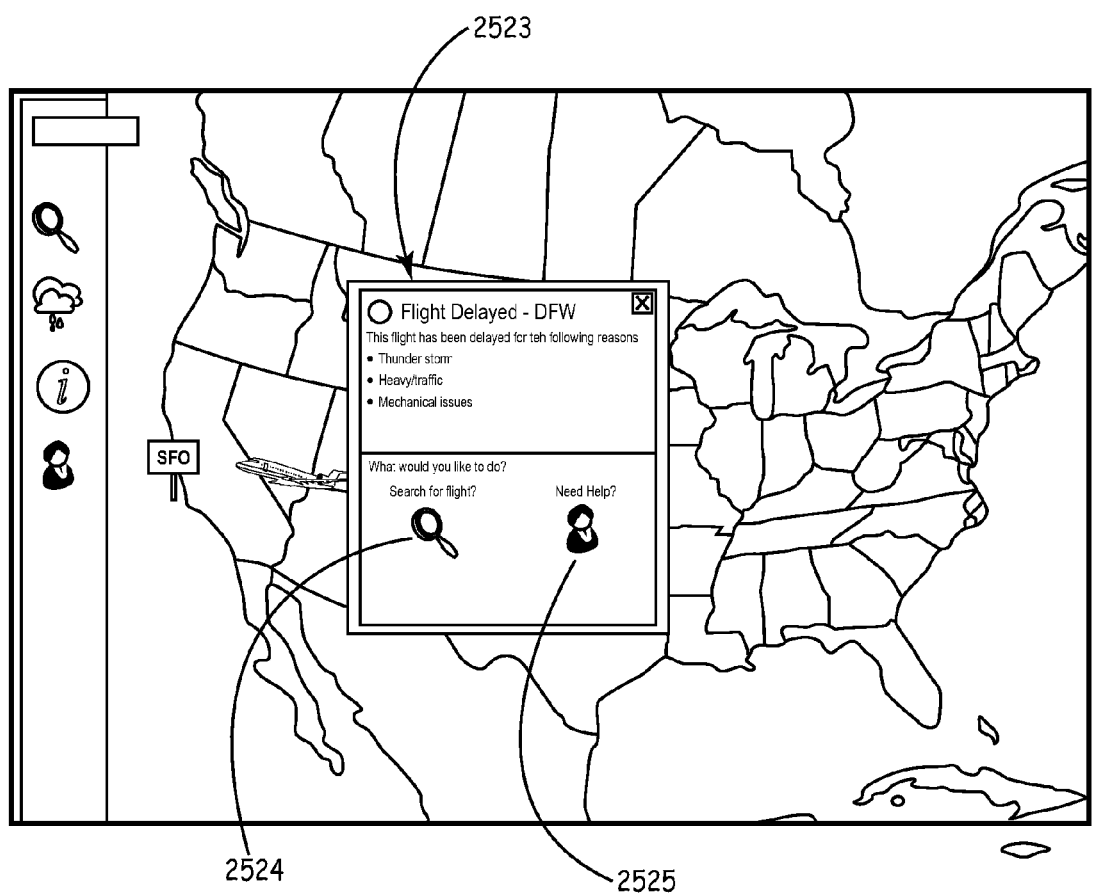
Figures 5, 25:
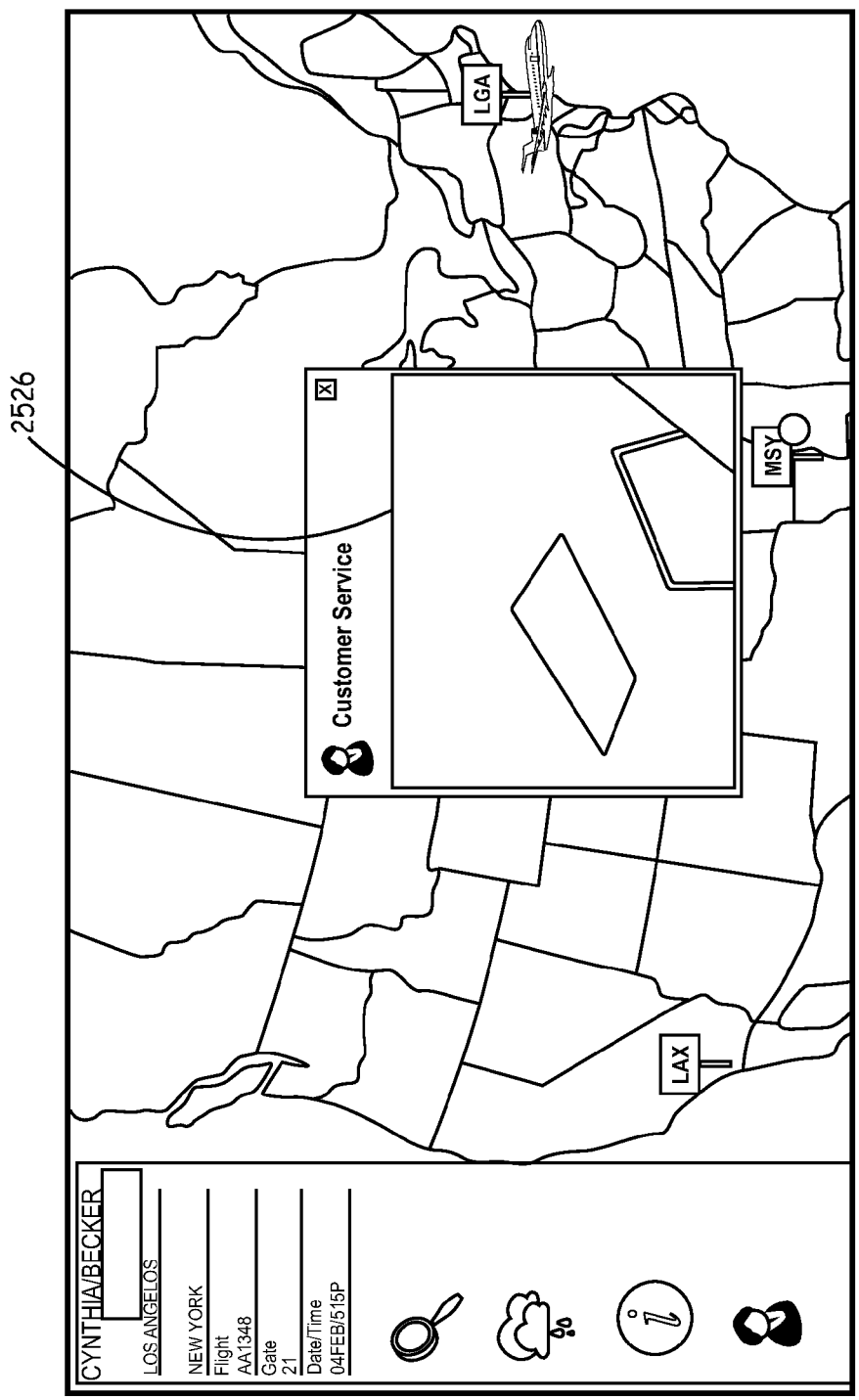
Figures 6, 25:
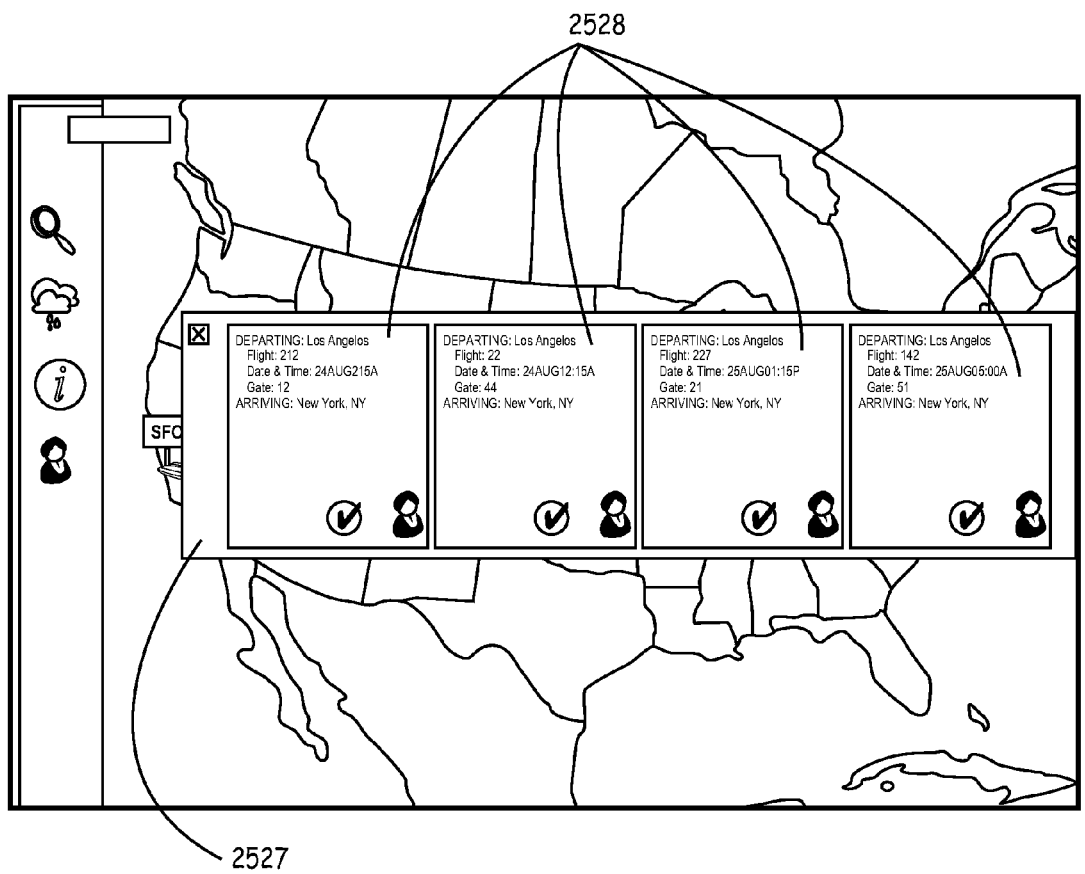

FIGS. 25-1, 25-2, 25-3, 25-4, 25-5, and 25-6 show several graphical user interfaces of a Flight Scheduling application. The application is illustratively launched by selecting the corresponding icon 1816 from the Application Launcher application menu 1804 (shown in FIG. 18). FIG. 25-1 shows a user interface 2501 that is illustratively the background of the application or the default interface of the application. The interface illustratively has background graphics 2502 that are displayed. Graphics 2502 are optionally animated graphics in that they move.

FIG. 25-2 shows a user interface 2503 that is used to gather information from a user. Interface 2503 illustratively has several windows that enable a user to provide various types of information. The ability to use multiple types of information may be more convenient to a user as opposed to requiring the user to know any one specific piece of information. A first window included within interface 2503 is a flight number window 2504. A user illustratively is able to retrieve his flight information by inputting the flight number into flight number field 2505. A second window is a record locator window 2507. It has a field 2508 that enables a user to enter his record locator (e.g. a code given by the airline). A third window is a boarding pass window 2510. It has a field 2511 that collects boarding pass information from a user. In one embodiment, the multitouch device running the application illustratively has a bar code reader, and a user is able to input his information by scanning his boarding pass. The input fields optionally each include a corresponding label, 2506, 2509, and 2512, that indicates to a user what type of information is to be entered into the fields.

FIG. 25-3 shows a user interface 2513. Interface 2513 is illustratively displayed after a user has entered an identifier that enables the application to retrieve his flight information. Interface 2513 has a main portion 2514 that includes a map. In the example shown in the figure, the map is of the lower forty-eight states of the U.S. The map that is displayed in the window is optionally selected based upon the user's flight plans. For instance, if a user was flying from Texas to France, the map could show the lower forty-eight states and Europe. The map includes graphic that indicate the user's departure location 2515, the user's destination location 2516, the user's flight path 2517, and if there are any intermediary lay over destinations, the map may also show those. In an embodiment, the graphics are animated (e.g. the location markers "bounce").

In addition to showing a graphical representation of the user's flight information, interface 2513 may also include a window 2518 that shows the user's flight information in text form. Window 2518 is shown in the figure as including the user's departure location, destination location, flight number, gate number, and date and time of the flight's departure. Window 2518 optionally includes any flight information (e.g. meal information, layover locations, flight duration, arrival time, etc.).

Interface 2513 also includes several buttons, a search for alternative flights button 2519, a weather button 2520, an information button 2521, and a customer service agent button 2522. FIG. 25-4 shows a window 2523 that is illustratively generated upon a user selecting the information button 2521. Information window 2523 reports information about the user's flight. For instance, in the example shown in the figure, window 2523 states that the user's flight has been delayed because of weather, traffic, and mechanical issues. If the user's flight was on time with no issues, window 2523 could illustratively state that the flight was on schedule or on time. Window 2523 optionally includes an additional flight search button 2524 and customer service agent button 2525.

FIG. 25-5 shows a customer service window 2526 that is generated upon a user selecting a customer service agent button. Window 2526 illustratively displays live, real time video of a customer service agent that can assist the user. As will be appreciated by those skilled in the art, this capability may eliminate the need to have customer service agents onsite which may reduce costs for an airline.

FIG. 25-6 shows an alternative flights window 2527 that is generated upon a user selecting a flight search button (e.g. button 2519 in FIG. 25-3 or button 2524 in FIG. 25-4). Window 2527 shows several flights that a user could take to get to his destination instead of his scheduled flight. Each of the different flights is illustratively positioned upon a tile or button 2528, and a user can select one of the flights by touching the tile or button. In an embodiment, upon a user selecting one of the alternative flights, the user interface is updated such that it shows the new information instead of the information for the previously scheduled flight (e.g. it shows updated departure, destination, layover, time, gate, terminal, etc. information). Alternatively, a user may be prompted to input credit card information (e.g. though an RFID reader) to pay for any additional costs for the flight change.

Finally, a user is illustratively given weather information about his departure location, his destination location, or both upon selection of weather button 2520 (labeled in FIG. 25-3). In one embodiment, a new window is generated and the information is given in text form. In another embodiment, the information is given in graphical form. For instance, the map shown in the user interface is illustratively updated to include graphics that indicate the weather (e.g. a sun, a snow flake, a rain drop, a dark cloud, etc.).

IV. CONCLUSION

As has been described above, embodiments of the present disclosure include multitouch devices, drivers, and applications that may have improved or useful features over existing multitouch devices, drivers, and applications. These various embodiments are illustratively practiced individually or in combination with each other. Also, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A universal touch input driver comprising:
   a device driver interface through which touch data is obtained from a device driver, wherein the device driver provides a set of parameters in each set of touch data;
   a computation module that processes a set of touch data and converts it into standardized touch data in a standardized format by identifying a parameter in the standardized format that is missing in the set of parameters provided in each set of the touch data, generating a value for the missing parameter and including the value of the missing parameter together with data from the set of touch data from the device driver in the standardized touch data; and
   an application interface through which the standardized touch data is transferred to a touch input application.

2. The universal touch input driver of claim 1, wherein the standardized touch data is formatted so as to include, for a record of a touch instance, an x-coordinate, a y-coordinate, a change in x, a change in y, a width of a touch, a height of a touch, and an acceleration.

3. The universal touch input driver of claim 1, wherein the standardized touch data is formatted in accordance with user datagram protocol.

4. The universal touch input driver of claim 1, wherein said transfer of standardized touch data is a transmission to a network port.

5. The universal touch input driver of claim 1, wherein the standardized touch data is formatted in extensible markup language.

6. The universal touch input driver of claim 1, wherein said transfer of standardized touch data is a transmission to a Transmission Control Protocol or UDP port.

7. The universal touch input driver of claim 1, wherein the standardized touch data is formatted so as to be consistent with both user datagram protocol and extensible markup language.

8. The universal touch input driver of claim 2, wherein the set of parameters in each set of touch data from the device driver is missing a change in x and a change in y parameter and includes a current x-coordinate and a current y-coordinate, the universal touch input driver further comprising:
   a storage module that stores an x-coordinate and a y-coordinate in the touch data from the device driver, wherein the computation module computes a change in x and a change in y based in part on the stored x-coordinate, the stored y coordinate, the current x-coordinate and the current y-coordinate.

9. The universal touch input driver of claim 8, wherein the universal touch input driver incorporates the change in x and the change in y into the standardized touch data.

10. A method of providing standardized data to a touch input application, the method comprising:
    obtaining first touch data comprising an x-coordinate and a y-coordinate of a touch from a device driver that only provides a limited number of parameters in the touch data for each touch;
    storing the x-coordinate and the y-coordinate of the touch;
    obtaining second touch data comprising a second x-coordinate and a second y-coordinate of a second touch from the device driver;
    determining that at least one parameter of a standardized format is not in the limited number of parameters in the touch data for each touch provided by the device driver;
    using the stored x-coordinate and stored y-coordinate and the second touch data to form touch data having the standardized format by determining a value for a parameter that is not in the limited number of parameters in touch data for each touch provided by the device driver; and
    transferring the touch data having the standardized format to the touch input application.

11. The method of claim 10, wherein forming the touch data having the standardized format comprises setting a value for the parameter that is not in the limited number of parameters to a default value in the touch data having the standardized format.

12. The method of claim 11, wherein the parameter that is not present in the limited number of parameters comprises a width of a touch.

13. The method of claim 10, wherein converting the touch data to touch data having a standardized format comprises generating touch data in multiple formats.

* * * * *